US010623695B1

(12) United States Patent
Prasannavenkatesan

(10) Patent No.: US 10,623,695 B1
(45) Date of Patent: Apr. 14, 2020

(54) VIDEO MESSAGING DEVICE HAVING A LEVITATING CAMERA

(71) Applicant: Facebook, Inc., Menlo Park, CA (US)

(72) Inventor: Rajesh Prasannavenkatesan, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 37 days.

(21) Appl. No.: 16/120,715

(22) Filed: Sep. 4, 2018

(51) Int. Cl.
 *H04N 5/225* (2006.01)
 *H04N 7/14* (2006.01)
 *G06F 3/16* (2006.01)
 *H02N 15/00* (2006.01)
(52) U.S. Cl.
 CPC ............ *H04N 7/142* (2013.01); *G06F 3/167* (2013.01); *H02N 15/00* (2013.01); *H04N 5/2253* (2013.01)
(58) Field of Classification Search
 CPC ...... H04N 7/142; H04N 5/2253; G06F 3/167; H02N 15/00
 See application file for complete search history.

(56) References Cited

U.S. PATENT DOCUMENTS 9,579,163 B2 * 2/2017 Valdastri .......... A61B 17/00234
2017/0285361 A1 * 10/2017 Ito ....................... G02B 27/646

OTHER PUBLICATIONS

Moon (hereinafter Moon), by 1-Ring,https://www.indiegogo.com/projects/moon-by-1-ring-world-s-coolest-smart-home-hub#/ (Year: 2017).*
Magnetic Levitation Floating IONdisplay platform, link—https://alexnld.com/product/magnetic-levitation-floating-ion-revolution-display-platform-tray-with-ez-float-tech (Year: 2017).*
OM/One, levitating BT Speaker (Year: 2015).*
Ice Ord, levitating Speaker (Year: 2015).*

* cited by examiner

*Primary Examiner* — Shahbaz Nazrul
(74) *Attorney, Agent, or Firm* — Fenwick & West LLP

(57) ABSTRACT

A video messaging device includes a levitating unit and a base unit that each have one or more electromagnets and one or more magnets that are positioned such that when the device is in use and the electromagnet(s) are activated, the electromagnet(s) repel each other or the magnet(s), causing the levitating unit, which includes a camera, to levitate above the base unit. The levitating unit may include a top member and a bottom member, in which the top member, which includes the camera, is configured to rotate relative to the bottom member of the levitating unit to counteract rotation of the bottom member of the levitating unit about a vertical axis relative to the base unit. Alternatively, the levitating unit may include a camera configured to capture a 360-degree field of view and software may be used to eliminate the effect of rotation of the camera about the vertical axis.

20 Claims, 14 Drawing Sheets

VIDEO MESSAGING DEVICE HAVING A LEVITATING CAMERA

BACKGROUND

This disclosure relates generally to a video messaging device, and more specifically to a video messaging device having a levitating camera.

Tablets, smartphones, laptops, desktop computers, televisions, and other devices that have built-in cameras are increasingly being used as communication terminals to initiate and receive video calls. Some of these devices, such as tablets, smartphones, and laptops are portable devices while others, such as desktop computers and televisions, are not. A portable device has the added convenience of allowing a user to initiate or receive a video call and to continue the video call while moving around by carrying the device with them. It may be desirable at times for users of portable devices to be able to use the devices in a hands-free manner (e.g., when making video calls that are long in duration or if the users are otherwise unable to hold or carry the devices during the video calls). Furthermore, video content captured by a portable device may appear shaky if the device is not supported by a stable support mechanism, such as a tripod or a stand. Such support mechanisms often include clamps, adhesives, or other components that allow portable devices to be secured to the support mechanisms.

While support mechanisms may allow users of portable devices to make video calls in a hands-free manner and allow the devices to capture more stabilized video content, they also may make it more difficult and time-consuming for users to move the devices for use in portable applications. For example, if a portable device is secured to a tripod by a clamp, a user of the device who wants to capture video content of a particular event occurring at a location outside the field of view of a camera on the device may have to first unclamp the device before moving it so that the location is within the field of view of the camera. In this example, if unclamping the device from the tripod is too difficult or time-consuming, the user may be unable to capture the desired video content before the event has ended.

To capture stabilized video content during a video call using a portable device that is easily moved for portable applications, the device may be configured to levitate. For example, suppose that an electromagnet is mounted on a portable device and that an additional electromagnet is mounted on a platform on which the portable device is resting. In this example, when activated, the electromagnets may repel each other, causing the device to levitate above the platform and allowing a camera on the device to capture stabilized video content without the need for clamps, adhesives, or other components that may prevent a user from easily moving the device.

However, levitating portable devices may have a tendency to rotate about a vertical axis, which may make it impractical for the devices to be used for making video calls. For example, suppose that the face of a user of a levitating portable device is initially within the field of view captured by a camera on the device during a video call made by the user. In this example, the device may rotate about a vertical axis during the video call, such that the user's face may no longer be within the field of view captured by the camera.

SUMMARY

Portable devices having built-in cameras may allow users of the devices to initiate or receive video calls and to continue the video calls while moving around by carrying the devices with them. Support mechanisms may allow users of portable devices to make video calls in a hands-free manner and allow the devices to capture more stabilized video content. Portable devices are often secured to support mechanisms through the use of components that may make it difficult for the devices to be moved for use in portable applications. Therefore, portable devices may be configured to levitate, allowing them to capture stabilized video content during video calls, while allowing the devices to be easily moved for portable applications. However, levitating portable devices may have a tendency to rotate about a vertical axis, which may make it impractical for the devices to be used for making video calls.

Therefore, a video messaging device capable of initiating or receiving a video call may have various components configured to counteract this tendency. The video messaging device includes a levitating unit and a base unit, each of which includes one or more electromagnets and/or one or more magnets. The electromagnet(s) and/or magnet(s) are positioned, such that when the video messaging device is in use, the electromagnet(s) are activated, causing the electromagnet(s) to repel each other or the magnet(s), which in turn causes the levitating unit, which includes a camera, to levitate above the base unit.

In some embodiments, to counteract the tendency of the levitating unit to rotate about a vertical axis relative to the base unit, the levitating unit may include a top member and a bottom member that are independently rotatable about the vertical axis. In such embodiments, the top member, which includes a camera, may be configured to rotate relative to the bottom member of the levitating unit to counteract rotation of the bottom member of the levitating unit relative to the base unit. In such embodiments, the levitating unit may include a rotation mechanism that couples the top member to the bottom member and allows the top member of the levitating unit to pivot about the vertical axis in a clockwise or a counter-clockwise direction relative to the bottom member of the levitating unit.

In other embodiments, to counteract the tendency of the levitating unit to rotate about a vertical axis relative to the base unit, the levitating unit may include a camera configured to capture a 360-degree field of view and the video messaging device may use software to eliminate the effect of rotation of the camera about the vertical axis based at least in part on the video data captured by the camera. In such embodiments, the effect of rotation of the camera about the vertical axis may be eliminated based on metadata included among the video data captured by the camera describing the video content captured by the camera. Alternatively, in such embodiments, the effect of rotation of the camera about the vertical axis also may be eliminated based on information describing the rotation of the camera about the vertical axis, which may be detected by various components of the levitating unit (e.g., one or more gyroscopes, one or more microphones, etc.).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
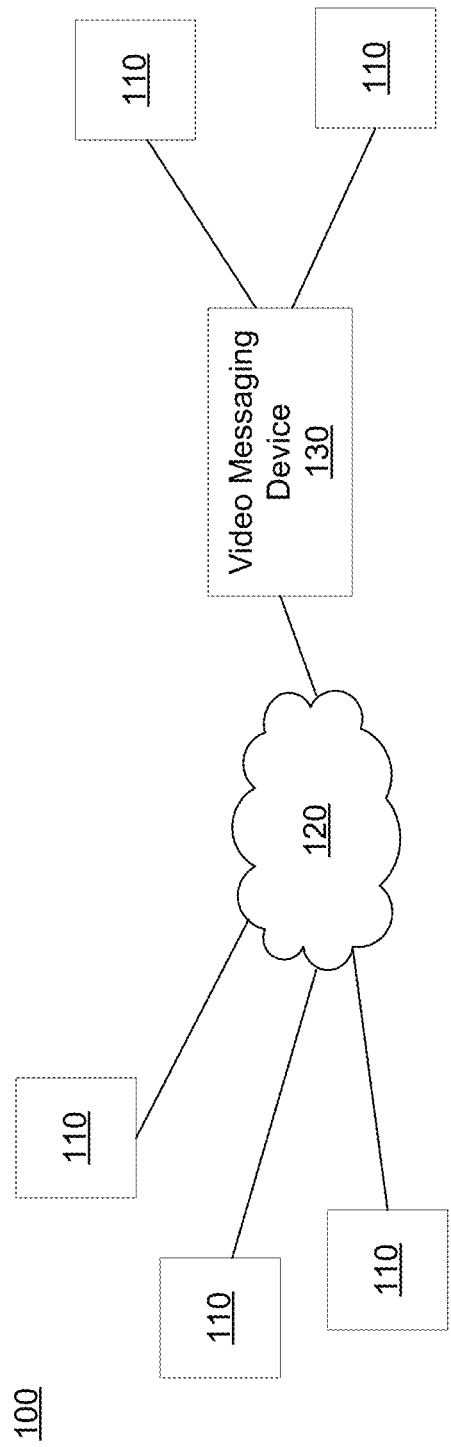
FIG. 1 is a block diagram of a system environment in which a video messaging device operates, in accordance with an embodiment.

FIG. 1 is a block diagram of a system environment 100 for a video messaging device 130. The system environment 100 shown by FIG. 1 comprises one or more client devices 110, a network 120, and the video messaging device 130. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a virtual reality device, an augmented reality device, a mixed reality device, a mobile telephone, a smartphone or another suitable device.

In embodiments in which a client device 110 is a mobile telephone, a smartphone, or any other type of device that is capable of serving as a communication terminal, the client device 110 may be capable of initiating as well as receiving video calls via the network 120. In such embodiments, a client device 110 may include a camera and a microphone that are capable of capturing video data and audio data, respectively, which may be communicated to a user of the video messaging device 130 via the network 120. Furthermore, a client device 110 may include a display that is capable of displaying video data to a user of the client device 110, as well as a speaker that is capable of outputting audio data.

In embodiments in which one or more of the client devices 110 are virtual reality devices, augmented reality devices, or mixed reality devices, the client device(s) 110 may be paired with the video messaging device 130. For example, one or more virtual reality headsets within a threshold distance of the video messaging device 130 may be paired with the video messaging device 130 (e.g., via Bluetooth). In embodiments in which one or more client devices 110 implement virtual reality, augmented reality, and/or mixed reality technology, the client device(s) 110 may receive data (e.g., video data and/or audio data) that has been processed by the video messaging device 130, as further described below.

In one embodiment, a client device 110 executes an application allowing a user of the client device 110 to interact with a user of the video messaging device 130. For example, a client device 110 executes a video messaging application to enable interaction between the client device 110 and the video messaging device 130 via the network 120. In another embodiment, a client device 110 interacts with the video messaging device 130 through an application programming interface (API) running on a native operating system of the client device 110, such as IOS® or ANDROID™.

The client devices 110 and the video messaging device 130 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The video messaging device 130 (e.g., a home video messaging device) is capable of initiating and receiving video calls. As further described below in conjunction with FIG. 2, the video messaging device 130 includes a levitating unit and a base unit. Components of the levitating unit include a camera and a magnet or an electromagnet while components of the base unit also include a magnet or an electromagnet. The magnet(s)/electromagnet(s) in the levitating unit and the base unit are positioned such that when the video messaging device 130 is in use (i.e., during a video call), one or more of the electromagnets are activated, causing the electromagnet(s) to repel each other or the magnet(s), which in turn causes the levitating unit to levitate above the base unit. Since the levitating unit levitates above the base unit when the video messaging device 130 is in use and the camera is included among components of the levitating unit, the camera is portable and may be moved or carried to other locations for portable applications during a video call. For example, the camera may be moved within a certain distance from a wireless router for a Wi-Fi network to which the video messaging device 130 is connected during a video call.

Figure 2:
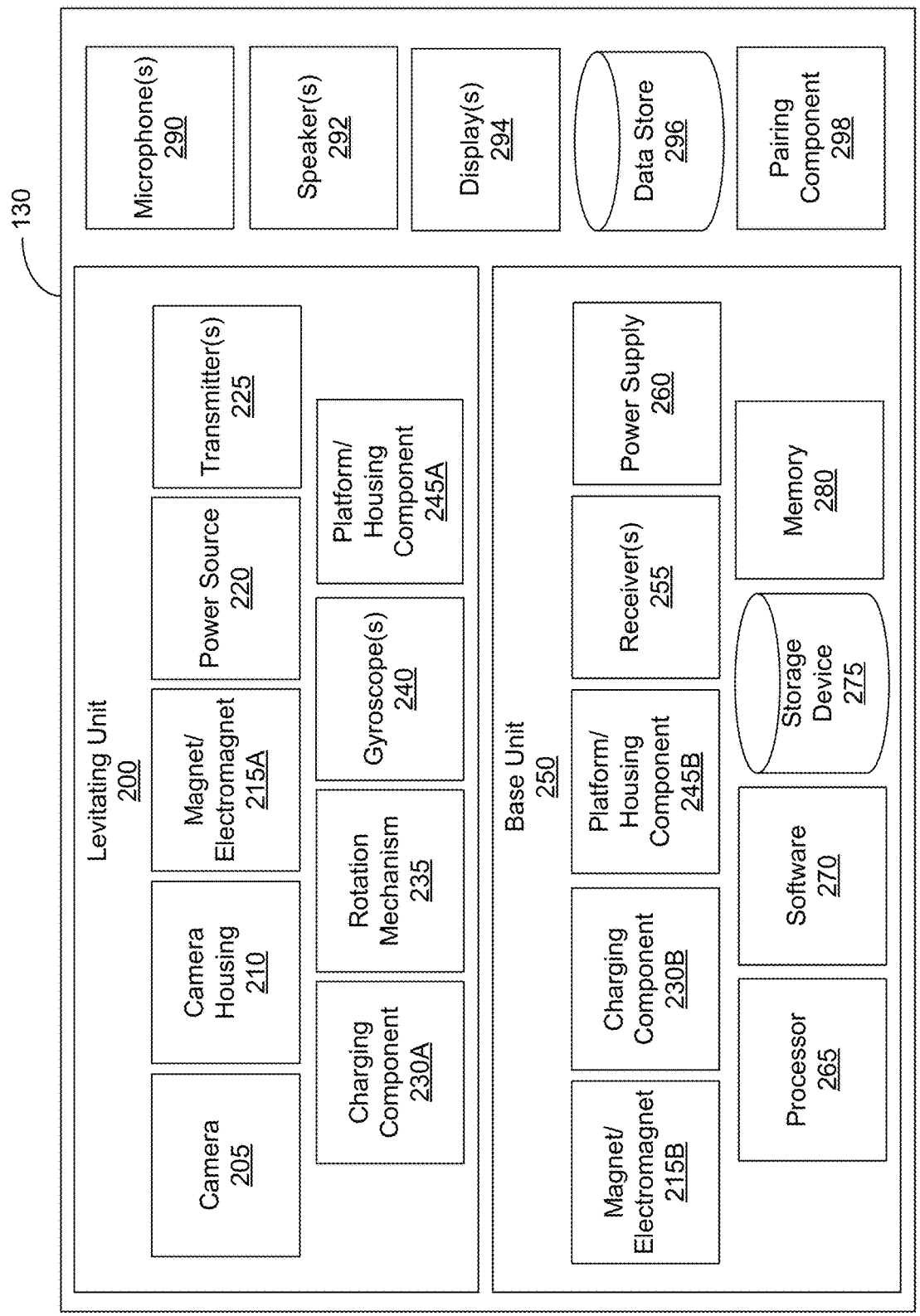
FIG. 2 is a block diagram of a video messaging device, in accordance with an embodiment.

FIG. 2 is a block diagram of an architecture of the video messaging device 130. The video messaging device 130 shown in FIG. 2 includes a levitating unit 200 and a base unit 250. Components of the levitating unit 200 may include a camera 205, a camera housing 210, a permanent magnet ("magnet") or an electromagnet 215A, a power source 220, one or more transmitters 225, a charging component 230A, a rotation mechanism 235, one or more gyroscopes 240, and a platform or a housing component 245A. Components of the base unit 250 may include a magnet or an electromagnet 215B, a charging component 230B, a platform or a housing component 245B, one or more receivers 255, a power supply 260, a processor 265, software 270, a storage device 275, and memory 280. Additional components of the video messaging device 130 may include one or more microphones 290, one or more speakers 292, one or more displays 294, a data store 296, and a pairing component 298. In some embodiments, some or all of these additional components of the video messaging device 130 (i.e., the microphone(s) 290, the speaker(s) 292, the display(s) 294, the data store 296, and the pairing component 298) may be included among and coupled to other components of the levitating unit 200, while in other embodiments, some or all of these additional components may be included among and coupled to other components of the base unit 250.

Although not depicted in FIG. 2, in some embodiments, the video messaging device 130 may include additional, fewer, or different components for various applications. For example, the video messaging device 130 may include one or more adapters that allow the video messaging device 130 to be synched to and/or connected to other components or devices (e.g., wireless headphones or a mobile device). As an additional example, the video messaging device 130 may include ports for various adapters (e.g., USB, AC, etc.), switches (e.g., an on/off switch), indicators (e.g., one or more lights indicating whether the video messaging device 130 is connected by Bluetooth or Wi-Fi), or any other components that may be associated with camera and/or telephony functionality. Conventional components such as network interfaces, security functions, load balancers, management and network operations consoles, and the like are not shown so as to not obscure the details of the system architecture.

The camera 205 in the levitating unit 200 captures (e.g., as shown in step 320 of FIG. 3 and step 620 of FIG. 6) video data associated with a user of the video messaging device 130 when the video messaging device 130 is in use (e.g., during a video call). The camera 205 may have various types of camera functionality, such as motion detection, light detection, object detection, boundary detection, depth sensing, face tracking, facial recognition, automatic zoom, automatic focus, video recording, pausing, and playback, etc. For example, if the camera 205 is capable of detecting objects and boundaries and is capturing an area that includes a room and an outdoor space, the camera 205 may detect multiple boundaries, such as a boundary between the room and the outdoor space, boundaries of the room (e.g., a floor, walls, and a ceiling), and objects in the room and in the outdoor space. In this example, if the camera 205 also has depth sensing technology, the camera 205 may be capable of determining which objects are closer to the video messaging device 130 than others. In various embodiments, the camera 205 may be configured to capture a 360-degree field of view. For example, the camera 205 may have multiple lenses and may film overlapping angles simultaneously to capture a 360-degree field of view. In some embodiments, the levitating unit 200 may include multiple cameras 205 configured to capture a 360-degree field of view. For example, multiple cameras 205 with overlapping fields of view may be used to capture a 360-degree field of view.

In some embodiments, video data captured by the video messaging device 130 also may include metadata describing the video content captured by the camera 205. Examples of metadata include a date and a time describing when video content is captured by the camera 205 and a time zone associated with a geographic location at which the video content is captured by the camera 205. In some embodiments, metadata included among video data captured by the camera 205 may be associated with various functionalities of the camera 205. For example, if functionalities of the camera 205 include face tracking and facial recognition technology, metadata included among the video data captured by the camera 205 may include information identifying one or more users of the video messaging device 130 whose faces are recognized by the camera 205 as well as locations (e.g., pixel coordinates) and times (e.g., timestamps) at which the faces are detected in the video content captured by the camera 205. As an additional example, if functionalities of the camera 205 include object detection, boundary detection, and depth sensing technology, metadata included among the video data captured by the camera 205 may describe the dimensions of objects and/or boundaries detected by the camera 205 as well as their locations (e.g., their relative distances from the video messaging device 130 and their pixel coordinates) and times at which they are detected in the video content.

In some embodiments, the camera housing 210 in the levitating unit 200 may securely enclose or partially enclose the camera 205. The camera housing 210 may be composed of metal, plastic, or any combination of materials that may be used to enclose or partially enclose the camera 205. For example, the camera housing 210 may include a rigid outer surface (e.g., polycarbonate) as well as a softer inner surface (e.g., foam or rubber) that protect the camera 205 from moisture, impact, etc. In some embodiments, the camera housing 210 also may include one or more components that may be used to secure the camera 205 within the camera housing 210 (e.g., bolts, screws, adhesives, etc.).

The magnet/electromagnet 215A in the levitating unit 200 and the magnet/electromagnet 215B in the base unit 250 are positioned so as to repel each other when one or more of the electromagnets 215A-B are activated (i.e., when one or more of the electromagnets 215A-B produce a magnetic field). In some embodiments, both the levitating unit 200 and the base unit 250 include electromagnets 215A-B that may be activated. In alternative embodiments, an electromagnet 215A is included in the levitating unit 200 while a magnet 215B is included in the base unit 250. In additional alternative embodiments, a magnet 215A is included in the levitating unit 200 while an electromagnet 215B is included in the base unit 250. For example, an electromagnet 215A in the levitating unit 200 is positioned such that when activated, it repels a magnet/electromagnet 215B in the base unit 250, causing the levitating unit 200 to levitate above the base unit 250. As an additional example, an electromagnet 215B in the base unit 250 is positioned such that when activated, it repels a magnet/electromagnet 215A in the levitating unit 200, causing the levitating unit 200 to levitate above the base unit 250.

In some embodiments, the camera 205 may be configured to capture video data and the microphone(s) 290 may be configured to capture audio data only when the levitating unit 200 is levitating above the base unit 250 for privacy reasons. In such embodiments, whether the levitating unit 200 is levitating above the base unit 250 allows a user of the video messaging device 130 to easily determine whether the video messaging device 130 is in use. For example, the camera 205 of the video messaging device 130 may not capture video data and thus may not implement various types of camera functionality (e.g., motion detection, object detection, boundary detection, face tracking, facial recognition, etc.) when the levitating unit 200 is not levitating above the base unit 250 (e.g., when the levitating unit 200 is being recharged, as described below). Similarly, in the above example, the microphone(s) 290 of the video messaging device 130 may not capture audio data when the levitating unit 200 is not levitating above the base unit 250.

The power source 220 may correspond to one or more batteries, a power bank, or any other suitable device capable of storing power. In some embodiments, the power source 220 is coupled to components of the levitating unit 200 that may require a source of power (e.g., the camera 205, the electromagnet 215A, the transmitter(s) 225, the rotation mechanism 235, etc.), such that when the video messaging device 130 is in use, these components may draw power from the power source 220. For example, the electromagnet 215A in the levitating unit 200 may draw power from the power source 220, which activates (e.g., as shown in step 310 of FIG. 3 and step 610 of FIG. 6) the electromagnet 215A by producing a magnetic field. In some embodiments, the power source 220 of the levitating unit 200 may be rechargeable. For example, the power source 220 may correspond to one or more rechargeable batteries. In embodiments in which the power source 220 is rechargeable, when the video messaging device 130 is not in use and the levitating unit 200 is resting upon the base unit 250, the base unit 250 may charge the power source 220 of the levitating unit 200 (e.g., using the charging components 230A-B), as further described below.

One or more transmitters 225 in the levitating unit 200 may wirelessly communicate (e.g., as shown in step 330 of FIG. 3 and step 630 of FIG. 6) data such as video data, audio data, angular velocity data, or any other suitable types of data detected by a component of the levitating unit 200 to one or more receivers 255 in the base unit 250. For example, the levitating unit 200 may include a transmitter 225 (e.g., included in or coupled to the camera 205) that wirelessly transmits video data captured by the camera 205 to a receiver 255 included in the base unit 250. In this example, the video data may be communicated to the base unit 250 via wireless means such as spread-spectrum, Wi-Fi, ultra-wideband, etc. As an additional example, if the levitating unit 200 includes a microphone 290, a transmitter 225 in the levitating unit 200 that is coupled to the microphone 290 may wirelessly transmit audio data received at the microphone 290 to a receiver 255 included in the base unit 250. As yet another example, a transmitter 225 in the levitating unit 200 also may wirelessly communicate information describing rotation of the levitating unit 200 (e.g., an angular velocity of the levitating unit 200 about a vertical axis) relative to the base unit 250 to a receiver 255 in the base unit 250.

Figure 3:
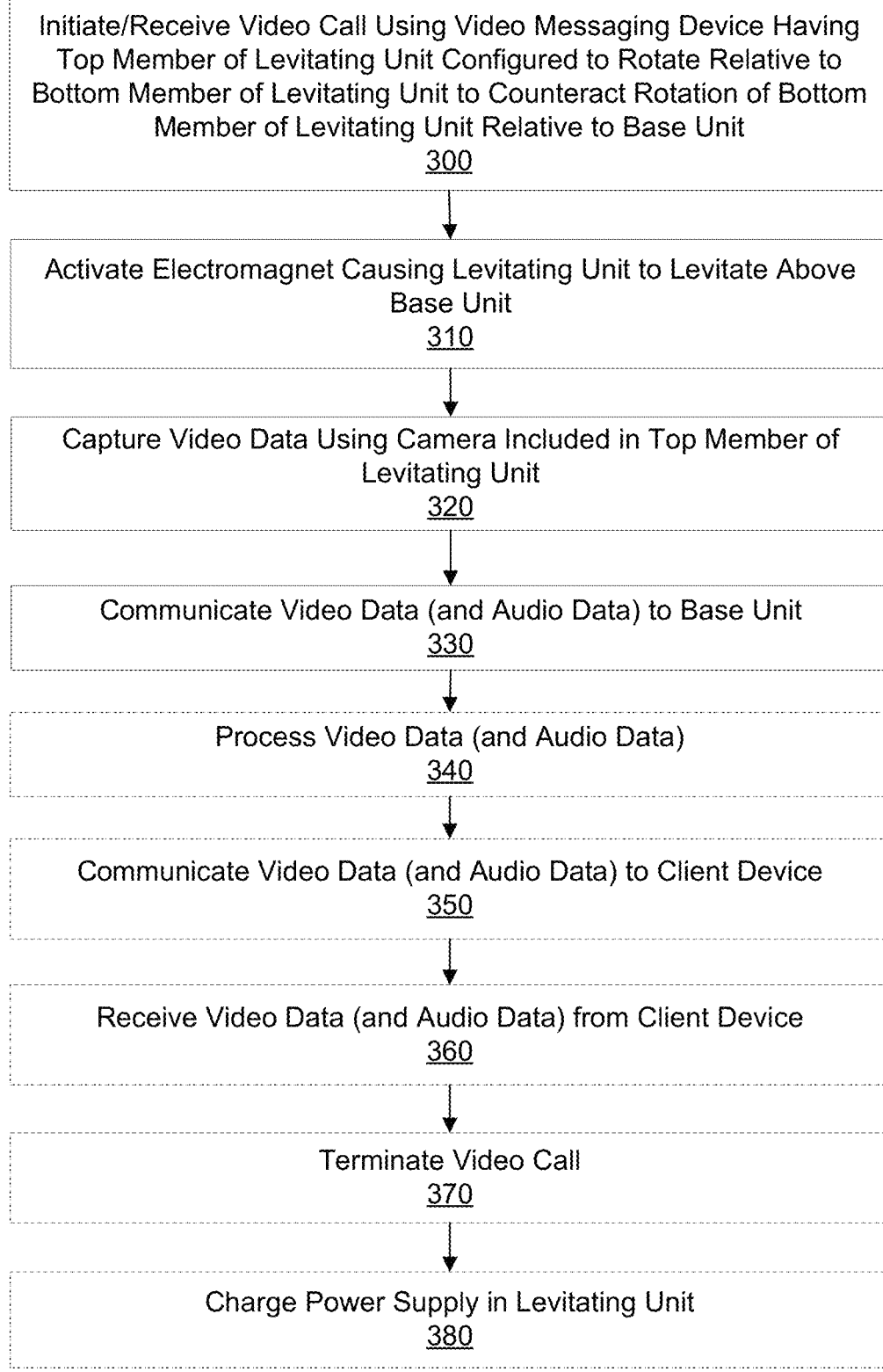
FIG. 3 is a flow chart of a method for making a video call using a video messaging device configured to counteract rotation of a member of a levitating unit of the device relative to a base unit of the device, in accordance with an embodiment.
Figure 6:
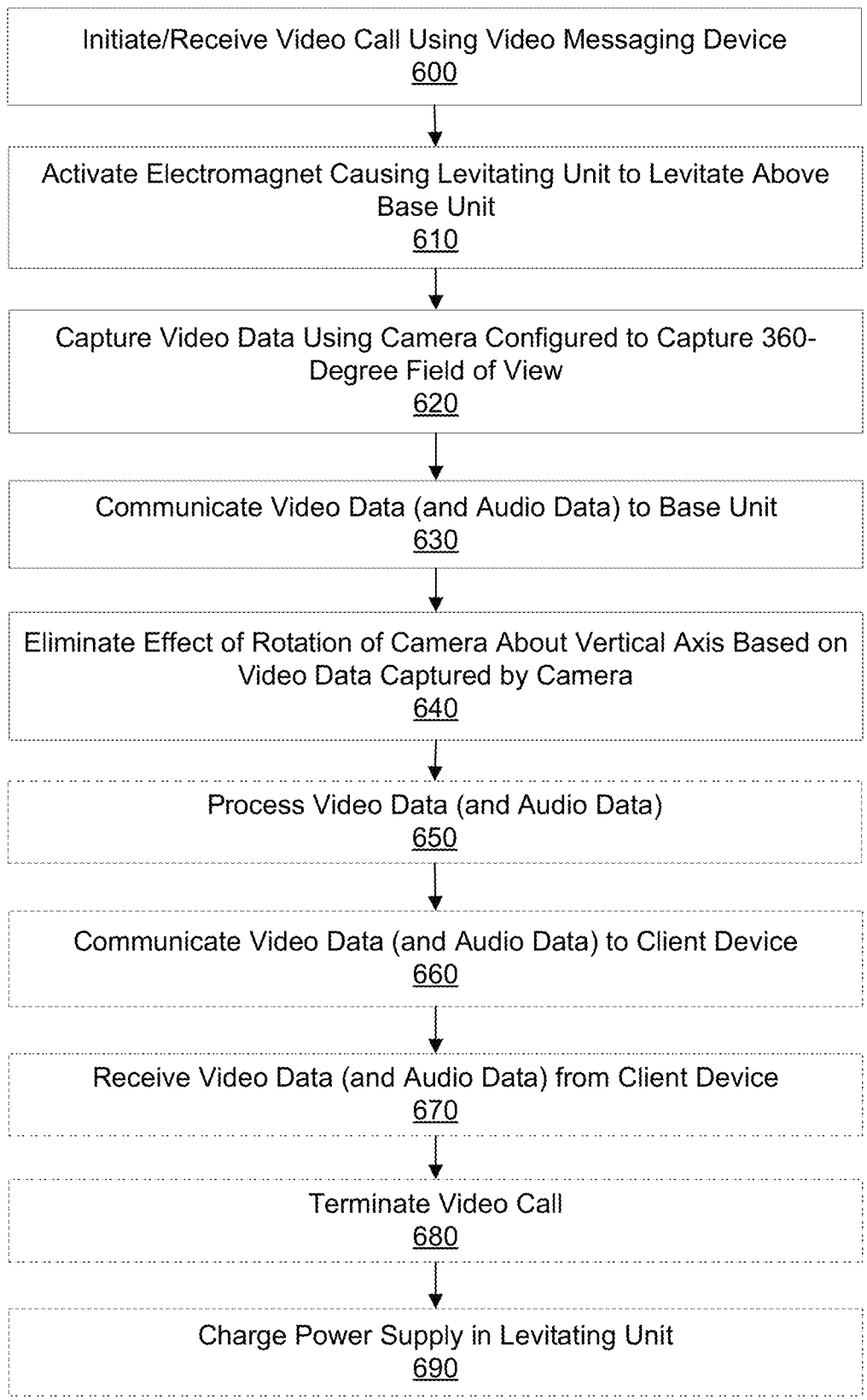
FIG. 6 is a flow chart of a method for making a video call using a video messaging device configured to eliminate an effect of rotation of a camera of the device based on video data captured by the camera, in accordance with an embodiment.

In various embodiments, the video messaging device 130 may include a set of charging components 230A-B (e.g., a set of induction coils or any other suitable components) that allows the power source 220 of the levitating unit 200 to be charged (e.g., as shown in step 380 of FIG. 3 and step 690 of FIG. 6). The charging component 230A in the levitating unit 200 may be coupled to the power source 220 of the levitating unit 200 while the charging component 230B in the base unit 250 may be coupled to the power supply 260 (described below) in the base unit 250. The power source 220 of the levitating unit 200 may be charged via electrical contact between the charging components 230A-B, via inductive charging between the charging components 230A-B, or via any other suitable mechanism. For example, when a bottom surface of the levitating unit 200 is in contact with a top surface of the base unit 250, the base unit 250 serves as a charging station by sending energy to a set of rechargeable batteries that serve as the power source 220 of the levitating unit 200. In this example, the rechargeable batteries may be recharged through inductive coupling using a set of induction coils or any other suitable charging components 230A-B in the base unit 250 and the levitating unit 200.

In embodiments in which the levitating unit 200 includes a top member and a bottom member, as further described below, the levitating unit 200 includes a rotation mechanism 235. In such embodiments, the rotation mechanism 235 couples the top member of the levitating unit 200 to the bottom member of the levitating unit 200 and allows the top member of the levitating unit 200 to pivot about a vertical axis in a clockwise or a counter-clockwise direction relative to the bottom member of the levitating unit 200 (e.g., via a pin, a rod, or some other suitable component). Furthermore, in such embodiments, the rotation mechanism 235 also includes a motor or other type of device that controls the rotation of the top member of the levitating unit 200 relative to the bottom member of the levitating unit 200. For example, for each degree that the bottom member of the levitating unit 200 rotates in a clockwise direction about a vertical axis relative to the base unit 250, a motor of the rotation mechanism 235 controls the rotation of the top member of the levitating unit 200, such that the top member rotates one degree in a counter-clockwise direction relative to the bottom member and vice versa.

In embodiments in which the levitating unit 200 includes a top member, a bottom member, and a rotation mechanism 235, the top member of the levitating unit 200 may be configured to rotate relative to the bottom member of the levitating unit 200 using a set of gyroscopes 240. The set of gyroscopes 240 may be included in the top member of the levitating unit 200 and/or the bottom member of the levitating unit 200 and may be coupled to the rotation mechanism 235. The rotation mechanism 235 may control the rotation of the top member of the levitating unit 200 based on information describing rotation about a vertical axis detected by the set of gyroscopes 240. For example, the bottom member of the levitating unit 200 may include a gyroscope 240 that is able to detect an angular velocity of the bottom member of the levitating unit 200 relative to the base unit 250. In this example, based on the angular velocity of the bottom member of the levitating unit 200 detected by the gyroscope 240, the rotation mechanism 235 may rotate the top member of the levitating unit 200 in the opposite direction of the bottom member of the levitating unit 200 by an amount that counteracts rotation of the bottom member of the levitating unit 200 relative to the base unit 250. As an additional example, the top member of the levitating unit 200 may include a gyroscope 240 that is able to detect an angular velocity of the top and bottom members of the levitating unit 200 relative to the base unit 250. In this example, based on the angular velocity detected by the gyroscope 240, the rotation mechanism 235 may rotate the top member of the levitating unit 200 in the opposite direction of the bottom member of the levitating unit 200 by an amount that counteracts this rotation.

Similarly, in embodiments in which the camera 205 is configured to capture a 360-degree field of view, the set of gyroscopes 240 in the levitating unit 200 may detect rotation of the camera 205 about a vertical axis relative to the base unit 250. In such embodiments, data describing the rotation of the levitating unit 200 may be wirelessly communicated to the base unit 250 (e.g., from a transmitter 225 in the levitating unit 200 to a receiver 255 in the base unit 250). For example, upon detecting rotation of the levitating unit 200 using a set of gyroscopes 240 in the levitating unit 200, information describing the rotation may be wirelessly communicated from a transmitter 225 in the levitating unit 200 to a receiver 255 in the base unit 250. In this example, the information communicated to the base unit 250 may indicate a speed of rotation of the levitating unit 200 relative to the base unit 250, as well as a direction of the rotation (i.e., clockwise or counter-clockwise).

In embodiments in which the levitating unit 200 includes a top member and a bottom member, components of the bottom member of the levitating unit 200 may include a platform and/or a housing component 245A (e.g., a chassis or other enclosure) to which additional components of the levitating unit 200 (e.g., the magnet/electromagnet 215A and/or the charging component 230A) may be coupled. Similarly, in some embodiments, components of the base unit 250 may include a platform and/or a housing component 245B to which additional components of the base unit 250 (e.g., the magnet/electromagnet 215B and/or the power supply 260) are coupled. When the video messaging device 130 is not in use, a bottom surface of the platform/housing component 245A or some other component of the levitating unit 200 (e.g., the magnet/electromagnet 215A, the camera housing 210, the charging component 230A, etc.) may rest upon a top surface of a component of the base unit 250 (e.g., the magnet/electromagnet 215B, the platform/housing component 245B, the charging component 230B, etc.).

One or more receivers 255 in the base unit 250 may receive data transmitted from one or more transmitters 225 in the levitating unit 200 via wireless means. As described above, examples of such data include video data, audio data, angular velocity data, or any other suitable types of data that may be captured or detected by a component of the levitating unit 200. As also described above, examples of wireless means that may be used to transmit data from a transmitter 225 to a receiver 255 include spread-spectrum, Wi-Fi, ultra-wideband, Bluetooth, or any other suitable wireless means. In some embodiments, the receiver(s) 255 also may receive data from one or more transmitters not located in the levitating unit 200. For example, if the video messaging device 130 is configured to be controlled using a remote control, a receiver 255 in the base unit 250 may receive data in the form of pulses of infrared (IR) light from a transmitter (e.g., a remote control) external to the video messaging device 130.

As described above, components of the base unit 250 also may include a power supply 260, which supplies power to components of the base unit 250 and which may be used to charge the power source 220 of the levitating unit 200. Power may be supplied to the base unit 250 via an AC adapter plugged into a wall outlet, a USB adapter plugged into a device having a power supply, one or more batteries, or via any other suitable means. In some embodiments the power supply 260 is coupled to the electromagnet 215B, the charging component 230B, the receiver(s) 255, the processor 265, and/or any other components of the base unit 250 that may require power, such that when the video messaging device 130 is in use, these components may draw power from the power supply 260. For example, the electromagnet 215B in the base unit 250 may draw power from the power supply 260, which activates (e.g., as shown in step 310 of FIG. 3 and step 610 of FIG. 6) the electromagnet 215B by producing a magnetic field.

The processor 265 may process (e.g., as shown in step 340 of FIG. 3 and step 650 of FIG. 6) various types of data. In some embodiments, the processor 265 may process data associated with video calls and network connections, such as registration of the client device(s) 110 participating in a video call, transmission of requests to initiate and receive video calls, requests to terminate video calls, etc. In some embodiments, the processor 265 also may process audio data received at the microphone(s) 290, video data captured by the camera 205, angular velocity data detected by the gyroscope(s) 240, or any other types of data received at or detected by components of the video messaging device 130. In some embodiments, the processor 265 may process audio data received at the microphone(s) 290 based on a location of a user of the video messaging device 130. For example, suppose that multiple voices are detected by the processor 265 from audio data received at the microphone(s) 290, but the face of only one user of the video messaging device 130 is detected by the camera 205. In this example, the processor 265 may isolate the voice of the user using voice reduction and isolation technology, noise reduction and isolation technology, or any other suitable technology (e.g., based on the distance and the direction of the detected face relative to the video messaging device 130, based on the volumes and directions of the detected voices, etc.). In embodiments in which data processed by the processor 265 is received at or detected by components of the levitating unit 200, the data may be received by the processor 265 from the receiver(s) 255, which receive(s) the data from the transmitter(s) 225 in the levitating unit 200.

The processor 265 may be configured to process data in order to provide various capabilities associated with telephony, such as caller ID, speed dial, call waiting, call blocking, 3-way calling, storage and retrieval of contacts in a contacts lists, voice-activation, etc. For example, if the video messaging device 130 is voice-activated, the processor 265 may process audio data received at a microphone 290 of the video messaging device 130, such that a user of the video messaging device 130 may turn on the video messaging device 130 with a voice command (e.g., "Call Mom") received at the microphone 290. In this example, once the video messaging device 130 has been turned on, the camera 205 automatically may detect a face of a person who issued the voice command and the processor 265 may process the request to initiate the video call based on contact information associated with the name "Mom" stored in a contacts list (e.g., retrieved from the data store 296, described below).

In embodiments in which the camera 205 is configured to capture a 360-degree field of view, the software 270 includes a set of instructions that may be executed by the processor 265 to eliminate the effect of rotation of the camera 205 of the levitating unit 200 about a vertical axis based on video data captured by the camera 205. For example, if the camera 205 captures a 360-degree field of view, once video data captured by the camera 205 is communicated to the base unit 250, the processor 265 in the base unit 250 may carry out software instructions that eliminate the effect of rotation of the camera 205 about a vertical axis. In this example, the software instructions may instruct the processor 265 to discard video content that captures a field of view beyond a given range (e.g., outside of a 60-degree field of view set by a user of the video messaging device 130 at the time that the video messaging device 130 was turned on or at the time that the video messaging device 130 initiated or received a video call).

In some embodiments, the processor 265 may process various types of data (e.g., video data and/or audio data) received by other components of the video messaging device 130 (e.g., the camera 205 and/or the microphone(s) 290) in real-time to implement virtual reality, augmented reality, and/or mixed reality technology. In such embodiments, once the processor 265 has processed the data, the processed data may be communicated (e.g., as shown in step 350 of FIG. 3 and step 660 of FIG. 6) to one or more client devices 110 (e.g., wearable headsets) to which the video messaging device 130 is paired, as further described below. For example, suppose that the video messaging device 130 has been paired to multiple mixed reality devices that are communicating with each other to play a game. In this example, the processor 265 may process video data captured by the camera 205 in real-time (e.g., by determining the locations and depths of objects and boundaries in a room in which the users of the mixed reality devices are located and by anchoring virtual objects to the detected objects). In the above example, the processed data is then communicated to the mixed reality devices as it is processed. Since processing such data in real-time is computationally expensive, performing this processing at the processor 265 of the video messaging device 130 and then communicating it to client devices 110 reduces the amount of processing required to be performed by the client devices 110. This is ideal for client devices 110 that are wearable (e.g., virtual reality headsets, augmented reality glasses, etc.), since such devices are often subject to thermal and weight constraints, which additional processing and processing hardware may cause to be exceeded.

The storage device 275 is any non-transitory computer-readable storage medium, such as a hard drive, a compact disk read-only memory (CD-ROM), a DVD, or a solid-state memory device while the memory 280 holds instructions and data used by the processor 265. Although the storage device 275 is shown as located in the base unit 250, in some embodiments, the storage device 275 may be local to or remote from the video messaging device 130 (e.g., within a storage area network (SAN)). In some embodiments, the instructions included in the software 270 are stored on the storage device 275, loaded into the memory 280, and executed by the processor 265.

As described above, components of the video messaging device 130 also may include one or more microphones 290 and one or more speakers 292, which may be included among components of the levitating unit 200 and/or the base unit 250. The microphone(s) 290 may receive audio data from a user of the video messaging device 130 (e.g., audio data to be communicated to an individual to whom the user is communicating or voice commands to turn on the video messaging device 130 or to initiate a video call), while the speaker(s) 292 may output audio data to the user of the video messaging device 130 (e.g., confirmation of instructions received from the user of the video messaging device 130 or audio data received from the individual with whom the user is communicating). The microphone(s) 290 and speaker(s) 292 of the video messaging device 130 may be coupled to a component of the base unit 250 (e.g., to the platform/housing component 245B) or to a component of the levitating unit 200 (e.g., to the camera 205 or the camera housing 210). As described above, in embodiments in which one or more microphones 290 are included among components of the levitating unit 200, the microphone(s) 290 may be coupled to a transmitter 225 in the levitating unit 200 that wirelessly communicates audio data received at the microphone(s) 290 to a receiver 255 included in the base unit 250.

In some embodiments, the speaker(s) 292 may output audio data based on a location and/or a distance of a user of the video messaging device 130 relative to the video messaging device 130. In such embodiments, the location and/or distance of the user relative to the video messaging device 130 may be determined by the camera 205 (e.g., using depth sensing, face tracking, and/or facial recognition technology). For example, suppose that the camera 205 detects a face of a user of the video messaging device 130 and determines a direction and a distance of the face relative to the video messaging device 130. In this example, if the speaker(s) 292 are located on a vertical surface of a top member of the levitating unit 200, the rotation mechanism 235 may rotate the top member, such that the speaker(s) 292 are facing the detected face. In the above example, a volume of the audio data output by the speaker(s) 292 also may be controlled based on the distance of the detected face, such that the volume is proportional to the distance.

As described above, components of the video messaging device 130 also may include one or more displays 294 (e.g., LCD screens, touchscreens, etc.), which may be included among components of the levitating unit 200 and/or the base unit 250. Each display 294 may be coupled to a component of the levitating unit 200 (e.g., the camera housing 210) or to a component of the base unit 250 (e.g., the platform/housing component 245B). The display(s) 294 may allow a user of the video messaging device 130 to select various options associated with the video messaging device 130 (e.g., to select a contact from a list of contacts, to initiate or receive a video call, etc.) and/or to view a video, an image, or any other types of information associated with a video call. For example, a user of the video messaging device 130 may access a list of contacts via a touchscreen or other type of display 294 coupled to the housing component 245B of the base unit 250 and request to initiate a video call by selecting a contact included in the list. In this example, once the call is initiated, an LCD screen or other type of display 294 coupled to the camera housing 210 of the levitating unit 200 may display a live video feed of an individual to whom the video call was made, as well as a window that displays a live video feed of the user who initiated the call being captured by the camera 205.

Various types of data may be stored in the data store 296 that allow the video messaging device 130 to provide various capabilities associated with telephony and/or camera functionality. Examples of such data include a selectable contacts list including contact information associated with individuals to whom a video call may be made, a list of recently called individuals, stored video and audio data associated with previous video calls, data describing various settings associated with the video messaging device 130 (e.g., an automatic zoom setting for the camera 205), data describing various preferences set by a user of the video messaging device 130 (e.g., ringtones for different individuals in a contacts list), data specific to a user of the video messaging device 130 or to the video messaging device 130 (e.g., a phone number, an IP address, etc.), or any other suitable types of data. In various embodiments, data stored in the data store 296 may be accessed and displayed using one or more of the displays 294.

As described above, components of the video messaging device 130 also may include a pairing component 298, which may be included among components of the levitating unit 200 and/or the base unit 250. The pairing component 298 may allow the video messaging device 130 to be paired to one or more client devices 110 (e.g., virtual reality devices, augmented reality devices, mixed reality devices, etc.) that are communicating with each other (e.g., for work, to play a game, or for any other type of social interaction between users of the devices). The pairing component 298 may allow the video messaging device 130 to be paired to a client device 110 if the client device 110 is within a threshold distance of the pairing component 298 (e.g., via Bluetooth).

Making a Video Call Using a Video Messaging Device Configured to Counteract Rotation of a Member of a Levitating Unit of the Device Relative to a Base Unit of the Device FIG. 3 is a flow chart of a method for making a video call using a video messaging device configured to counteract rotation of a member of a levitating unit of the device relative to a base unit of the device. In other embodiments, the method may include different and/or additional steps than those shown in FIG. 3. Additionally, steps of the method may be performed in a different order than the order described in conjunction with FIG. 3.

A video messaging device 130 including a levitating unit 200 and a base unit 250 initiates 300 or receives 300 a video call. For example, the video messaging device 130 may initiate 300 a video call in response to receiving instructions from a user of the video messaging device 130 to place an outgoing video call to an individual having contact information included in a contacts list (e.g., retrieved from the data store 296). As an additional example, the video messaging device 130 may receive 300 a video call in response to receiving instructions from a user of the video messaging device 130 to answer an incoming video call.

Figure 4A:
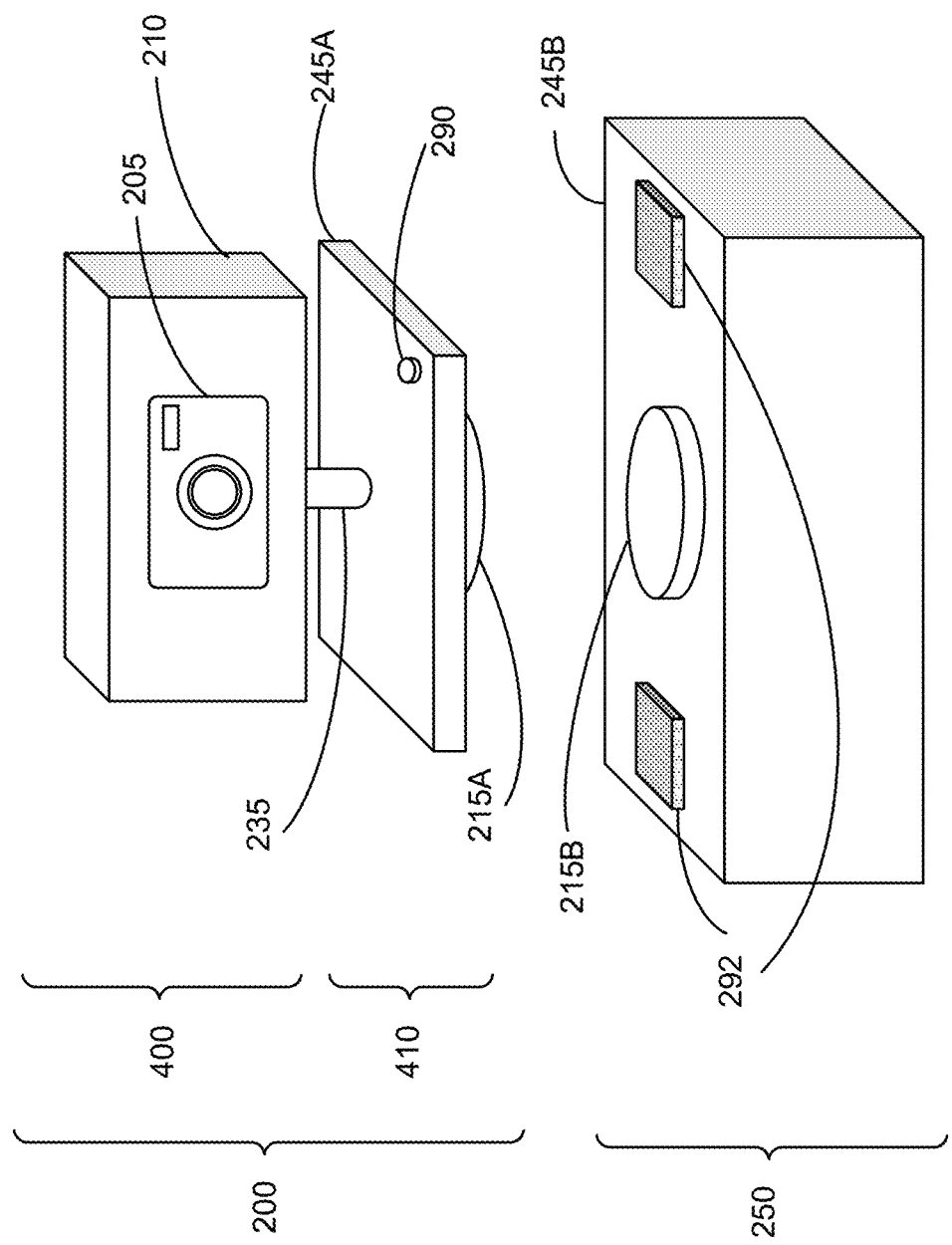
FIGS. 4A-4C illustrate an example of a video messaging device configured to counteract rotation of a member of a levitating unit of the device relative to a base unit of the device, in accordance with an embodiment.

As described above in conjunction with FIG. 2, in some embodiments, the levitating unit 200 includes a top member and a bottom member. As shown in the example of FIG. 4A, components of the top member 400 of the levitating unit 200 may include a camera 205 and a camera housing 210 to which the camera 205 may be coupled, while components of the bottom member 410 of the levitating unit 200 may include a platform/housing component 245A to which a magnet/electromagnet 215A of the levitating unit 200 and a microphone 290 are coupled. As also described above in conjunction with FIG. 2, in some embodiments, the camera 205 may be configured to capture a 360-degree field of view (e.g., using multiple cameras 205 with overlapping fields of view or a camera 205 having multiple lenses that films overlapping angles simultaneously). In embodiments in which the levitating unit 200 includes a top member 400 and a bottom member 410, the top member 400 may be coupled to the bottom member 410 of the levitating unit 200 by the rotation mechanism 235, as shown in FIG. 4A. Although not depicted in FIG. 4A, as described above, components of the levitating unit 200 also may include a power source 220, one or more transmitters 225, a charging component 230A, one or more gyroscopes 240, one or more additional speakers 292, one or more displays 294, and a data store 296.

Referring still to FIG. 4A, in some embodiments, components of the base unit 250 include a platform/housing component 245B to which a magnet/electromagnet 215B of the base unit 250 and one or more speakers 292 are coupled. The magnet/electromagnet 215B of the base unit 250 is positioned relative to the magnet/electromagnet 215A of the levitating unit 200 such that when one or more of the electromagnets 215A-B are activated, they repel each other or the magnet(s) 215A-B, which in turn causes the levitating unit 200 to levitate above the base unit 250. Although not depicted in FIG. 4A, as described above, components of the base unit 250 also may include a charging component 230B, one or more receivers 255, a power supply 260, a processor 265, software 270, a storage device 275, memory 280, one or more additional speakers 292, one or more displays 294, and a data store 296.

Referring back to FIG. 3, once the video messaging device 130 has initiated 300 or received 300 the video call, one or more electromagnets 215A-B in the levitating unit 200 and/or the base unit 250 are activated 310 (e.g., by drawing power from the power source 220 of the levitating unit 200 and/or from the power supply 260 in the base unit 250), causing the electromagnet(s) 215A-B to produce a magnetic field and repel each other or the magnet 215A-B, which in turn causes the levitating unit 200 to levitate above the base unit 250. Since the levitating unit 200 levitates above the base unit 250 when the video messaging device 130 is in use and components of the levitating unit 200 include the camera 205, the camera 205 is portable and may be moved or carried away from the base unit 250 to other locations for portable applications during the video call.

Video data is then captured 320 by the camera 205 included in the top member 400 of the levitating unit 200. The video data captured 320 by the camera 205 corresponds to video data associated with a user of the video messaging device 130 to be communicated to an individual to whom the video call was initiated 300 or from whom the video call was received 300. In various embodiments, if the video messaging device 130 includes one or more displays 294, the video data captured 320 by the camera 205 may be presented in the display(s) 294. For example, a live video feed of a user of the video messaging device 130 being captured 320 by the camera 205 may be presented in a window within the display(s) 294. In conjunction with capturing 320 the video data, audio data to be communicated to an individual to whom a user of the video messaging device 130 is communicating also may be captured by one or more microphones 290 in the levitating unit 200 or in the base unit 250. As described above in conjunction with FIG. 2, in some embodiments, the camera 205 may be configured to capture 320 video data and the microphone(s) 290 may be configured to capture audio data only when the levitating unit 200 is levitating above the base unit 250 for privacy reasons.

Figure 4B:
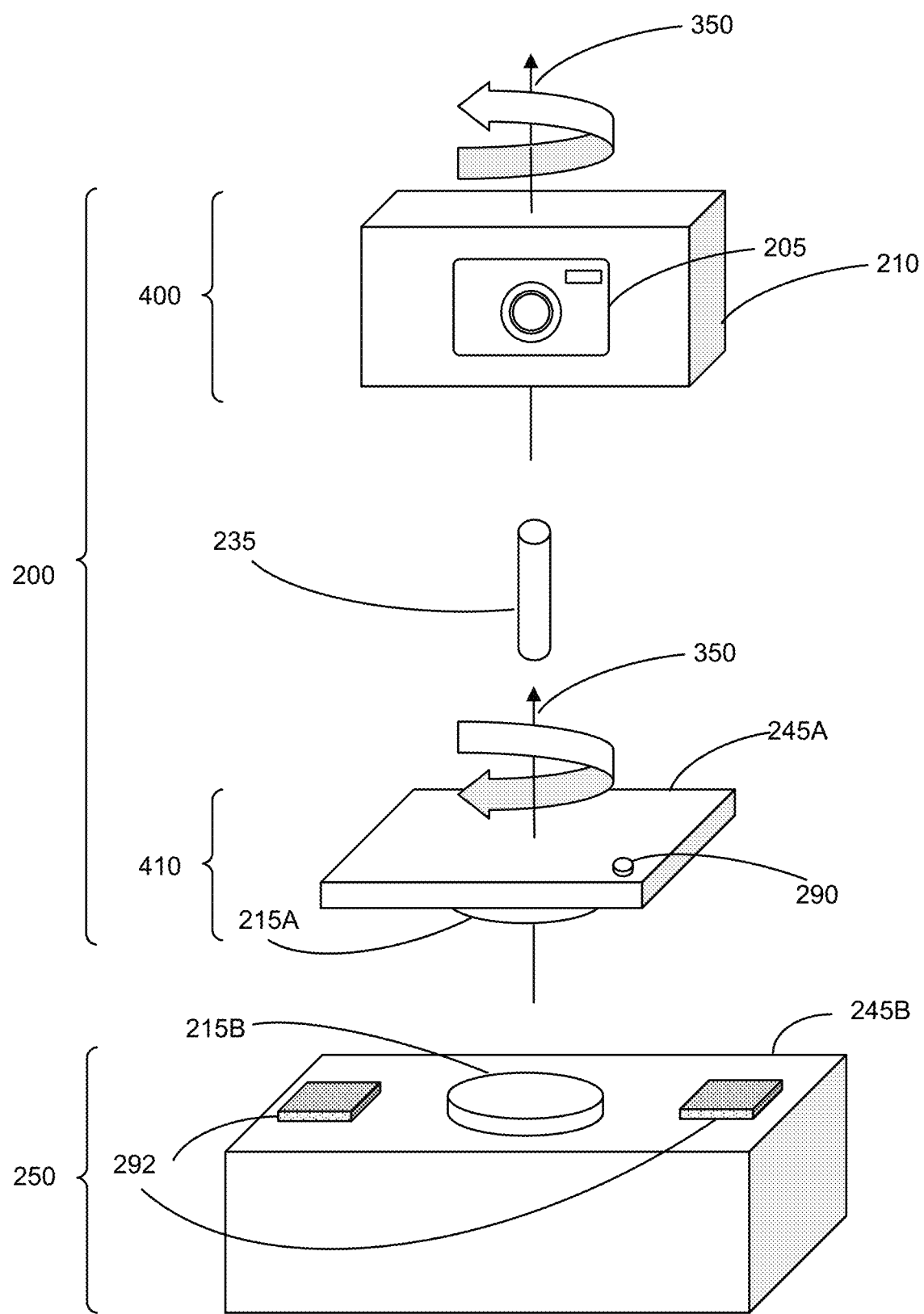
Figure 4C:
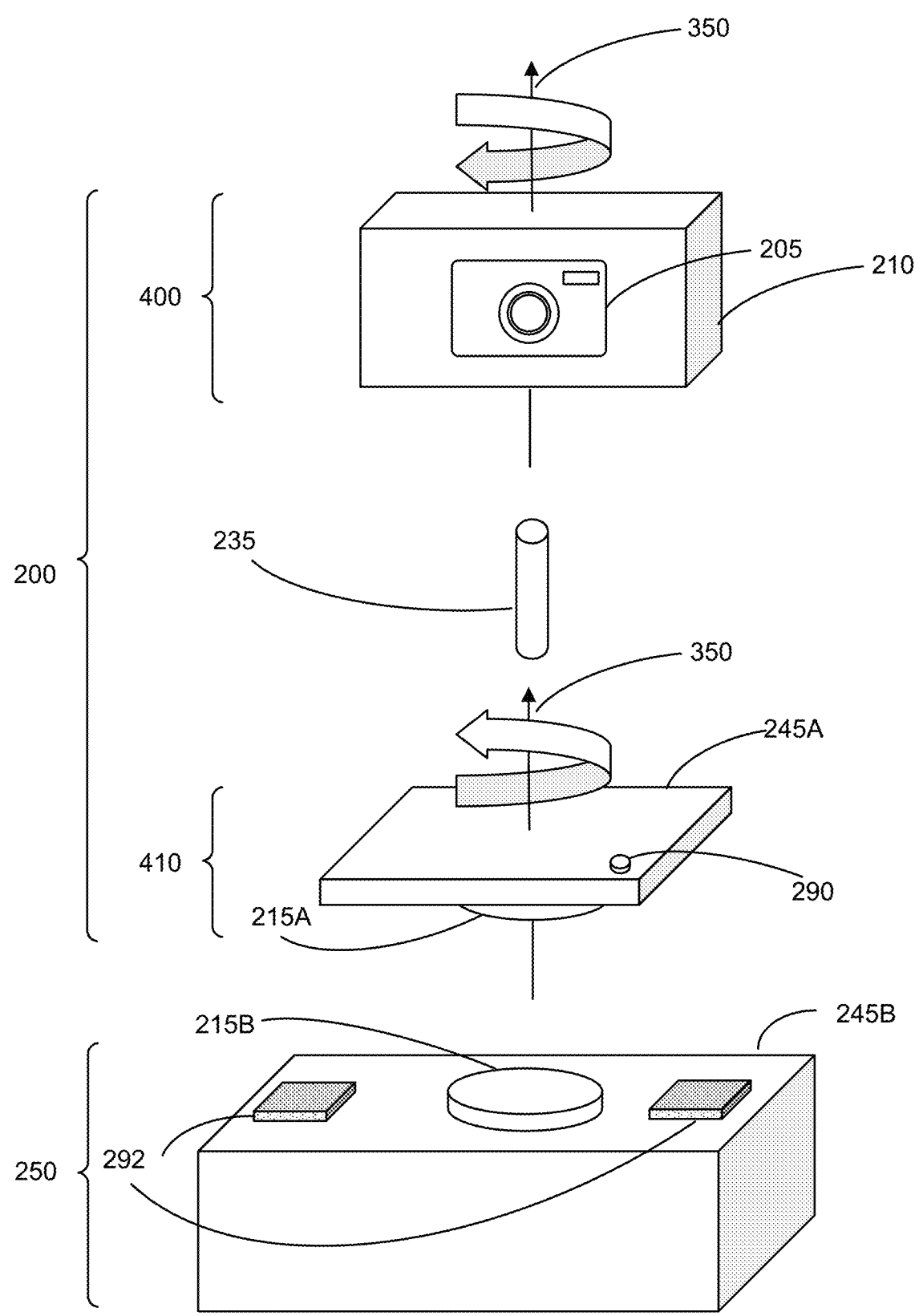

When the video messaging device 130 is in use, since the levitating unit 200 levitates above the base unit 250, the levitating unit 200 may tend to rotate about a vertical axis, which may be undesirable (e.g., if a user of the video messaging device 130 is no longer within a field of view captured 320 by the camera 205 due to rotation of the levitating unit 200). In some embodiments, to counteract the tendency of the levitating unit 200 to rotate when the video messaging device 130 is in use, the top member 400 may be configured to rotate relative to the bottom member 410 of the levitating unit 200 to counteract the rotation of the bottom member 410 of the levitating unit 200 relative to the base unit 250. The rotation mechanism 235 allows the top member 400 of the levitating unit 200 to pivot about a vertical axis in a clockwise or a counter-clockwise direction relative to the bottom member 410 of the levitating unit 200 (e.g., using a motor or other type of device that controls the rotation of the top member 400 of the levitating unit 200 relative to the bottom member 410 of the levitating unit 200). For example, as shown in FIG. 4B, for each degree that the bottom member 410 of the levitating unit 200 rotates in a counter-clockwise direction about a vertical axis relative to the base unit 250, the rotation mechanism 235 controls the rotation of the top member 400 of the levitating unit 200, such that the top member 400 rotates one degree in a clockwise direction relative to the bottom member 410. Similarly, as shown in the example of FIG. 4C, for each degree that the bottom member 410 of the levitating unit 200 rotates in a clockwise direction about a vertical axis relative to the base unit 250, the rotation mechanism 235 controls the rotation of the top member 400 of the levitating unit 200, such that the top member 400 rotates one degree in a counter-clockwise direction relative to the bottom member 410.

As described above, in some embodiments, the top member 400 of the levitating unit 200 may be configured to rotate relative to the bottom member 410 of the levitating unit 200 via a set of gyroscopes 240 included in the top member 400 of the levitating unit 200 and/or the bottom member 410 of the levitating unit 200. In such embodiments, the set of gyroscopes 240 may be coupled to the rotation mechanism 235, allowing the rotation mechanism 235 to control the rotation of the top member 400 of the levitating unit 200 based on information describing rotation about a vertical axis (e.g., an angular velocity) detected by the set of gyroscopes 240. For example, based on a speed and a direction of rotation about a vertical axis detected by the set of gyroscopes 240, the rotation mechanism 235 may control the rotation of the top member 400 of the levitating unit 200 relative to the bottom member 410 of the levitating unit 200 to counteract the rotation of the bottom member 410 of the levitating unit 200 relative to the base unit 250.

Figure 5A:
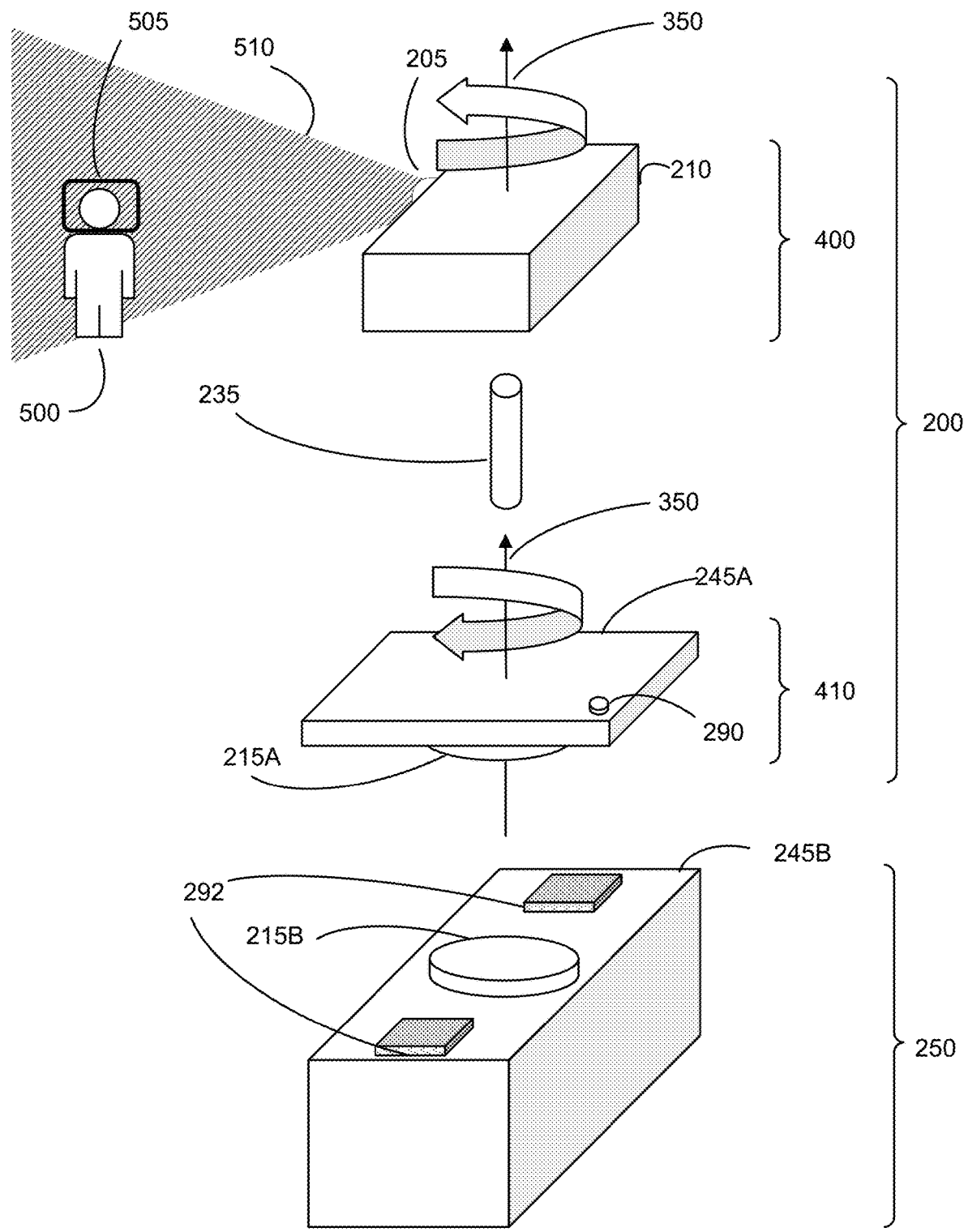
FIG. 5A is a conceptual diagram of making a video call using a video messaging device configured to counteract rotation of a member of a levitating unit of the device relative to a base unit of the device, in accordance with an embodiment.

In various embodiments, the top member 400 of the levitating unit 200 may be configured to rotate relative to the bottom member 410 of the levitating unit 200 based on various capabilities of the video messaging device 130. In embodiments in which capabilities of the camera 205 include face tracking and/or facial recognition technology, rotation of the top member 400 of the levitating unit 200 may be controlled by the rotation mechanism 235 based on one or more faces detected and/or recognized by the camera 205. For example, as shown in FIG. 5A, suppose that a camera 205 is located on a vertical surface of the top member 400 of the levitating unit 200. In this example, if a face 505 of a user 500 of the video messaging device 130 is detected by the camera 205, the rotation mechanism 235 may rotate the top member 400 of the levitating unit 200 in the direction of the detected face 505, such that a field of view 510 of the camera 205 captures 320 the face 505 of the user 500. Furthermore, in such embodiments, a zoom setting of the camera 205 also may be controlled based on one or more faces detected and/or recognized by the camera 205. In the above example, if the camera 205 detects multiple faces, the camera 205 also may zoom out to capture 320 all of the faces that are detected.

Figure 5B:
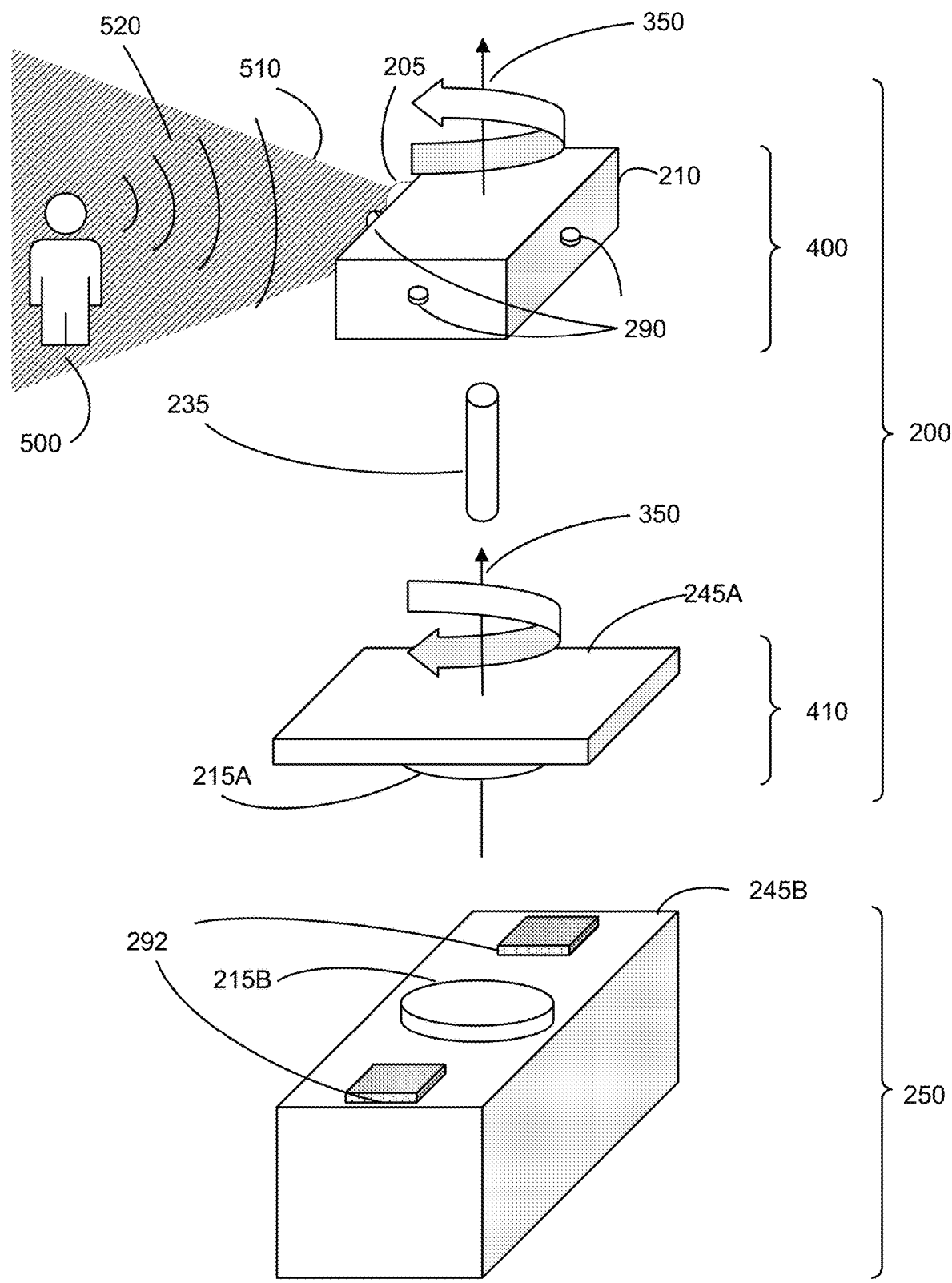
FIG. 5B is an additional conceptual diagram of making a video call using a video messaging device configured to counteract rotation of a camera of a levitating unit of the device relative to a base unit of the device, in accordance with an embodiment.

In some embodiments, rotation of the top member 400 of the levitating unit 200 relative to the bottom member 410 of the levitating unit 200 may be controlled by the rotation mechanism 235 based on one or more voices detected by the video messaging device 130 (e.g., by multiple microphones 290 on the video messaging device 130). For example, as shown in FIG. 5B, suppose that multiple microphones 290 are located on multiple vertical surfaces of the top member 400 of the levitating unit 200. In this example, if a voice 520 of a user 500 of the video messaging device 130 is detected by the microphones 290, the rotation mechanism 235 may rotate the top member 400 of the levitating unit 200 in the direction of the microphone 290 at which the detected voice 520 was the loudest, such that a field of view 510 of the camera 205 captures the user 500.

Referring again to FIG. 3, once the video data is captured 320 by the camera 205, the video data is communicated 330 to the base unit 250 via wireless means (e.g., from a transmitter 225 in the levitating unit 200 to a receiver 255 in the base unit 250). For example, video data may be communicated 330 from a transmitter 225 in the levitating unit 200 to a receiver 255 in the base unit 250 via spread-spectrum, Wi-Fi, ultra-wideband, or any other suitable wireless means. In embodiments in which the levitating unit 200 includes a microphone 290, during the video call, audio data also may be wirelessly communicated 330 to the base unit 250 (e.g., from a transmitter 225 in the levitating unit 200 to a receiver 255 in the base unit 250). For example, audio data may be communicated 330 from a transmitter 225 in the levitating unit 200 to a receiver 255 in the base unit 250 via Bluetooth, Wi-Fi, or any other suitable wireless means.

In some embodiments, once the video data and the audio data are received at the base unit 250, the video data and/or the audio data may be processed 340 by the processor 265. As described above in conjunction with FIG. 2, in some embodiments, the processor 265 may process 340 audio data received at the microphone(s) 290 based on a location of a user of the video messaging device 130. For example, the processor 265 may isolate the voice of a user of the video messaging device 130 from multiple voices using voice reduction and isolation technology. As an additional example, the processor 265 may isolate the voice of a user of the video messaging device 130 from background noise using noise reduction and isolation technology. As also described above in conjunction with FIG. 2, in some embodiments, the processor 265 also may process 340 various types of data captured 320 by other components of the video messaging device 130 in real-time to implement virtual reality, augmented reality, and/or mixed reality technology. For example, the processor 265 may process 340 video data by determining the locations and depths of objects detected by the camera 205 and by overlaying virtual objects onto the detected objects or by anchoring virtual objects to the detected objects.

The video messaging device 130 may then communicate 350 the processed video data and/or audio data to a client device 110 associated with an individual with whom a user of the video messaging device 130 initiated 300 the video call or from whom the user received 300 the video call (e.g., via the network 120). In some embodiments, the processed video data and/or audio data may be communicated 350 to one or more client devices 110 (e.g., wearable headsets) to which the video messaging device 130 is paired (e.g., via the pairing component 298). For example, if the video messaging device 130 has been paired to multiple virtual reality, augmented reality, and/or mixed reality devices that are communicating with each other to play a game, the processed data is communicated 350 to the devices as it is processed.

The video messaging device 130 also may receive 360 video data and/or audio data from the client device 110 associated with the individual with whom the user initiated 300 or received 300 the video call. Video data received 360 at the video messaging device 130 (e.g., a live video feed of the individual) may be presented in one or more displays 294 of the video messaging device 130 while audio data received 360 at the video messaging device 130 may be output using one or more speakers 292 of the video messaging device 130. As described above in conjunction with FIG. 2, in some embodiments, the speaker(s) 292 may output audio data based on a location and/or a distance of a user of the video messaging device 130 relative to the video messaging device 130. In such embodiments, the location and/or distance of the user relative to the video messaging device 130 may be determined by the camera 205 (e.g., using depth sensing, face tracking, and/or facial recognition technology). For example, if the speaker(s) 292 are located on a vertical surface of a top member of the levitating unit 200, the rotation mechanism 235 may rotate the top member, such that the speaker(s) 292 are facing the direction of a face of a user of the video messaging device 130 detected by the camera 205 and a volume of the audio data output by the speaker(s) 292 may be controlled, such that it is proportional to the distance.

The video messaging device 130 subsequently may terminate 370 the video call (e.g., in response to a request from a user of the video messaging device 130 to end the video call or in response to a loss of network connection by the video messaging device 130). In some embodiments, once the video call is terminated 370, the electromagnet(s) 215A-B may stop drawing power from the power source 220 of the levitating unit 200 and/or the power supply 260 in the base unit 250.

When the video messaging device 130 is not in use (i.e., when the electromagnet(s) 215A-B are no longer being activated 310), the levitating unit 200 may rest upon the base unit 250 and the power source 220 in the levitating unit 200 may be charged 380 (e.g., using the set of charging components 230A-B in the levitating unit 200 and the base unit 250). As described above, the power source 220 of the levitating unit 200 may be charged 380 via electrical contact between the charging components 230A-B, via inductive charging between the charging components 230A-B, or via any other suitable mechanism. For example, when a bottom surface of the levitating unit 200 is in contact with a top surface of the base unit 250, the base unit 250 serves as a charging station by sending energy to a set of rechargeable batteries that serve as the power source 220 of the levitating unit 200 (e.g., through inductive coupling using a set of induction coils or any other suitable charging components 230A-B in the base unit 250 and the levitating unit 200). As described above, for privacy reasons, the camera 205 may not be configured to capture 320 video data and the microphone(s) 290 may not be configured to capture audio data when the levitating unit 200 is being charged 380.

Making a Video Call Using a Video Messaging Device Configured to Eliminate an Effect of Rotation of a Camera of the Device Based on Video Data Captured by the Camera FIG. 6 is a flow chart of a method for making a video call using a video messaging device configured to eliminate an effect of rotation of a camera of the device based on video data captured by the camera. In other embodiments, the method may include different and/or additional steps than those shown in FIG. 6. Additionally, steps of the method may be performed in a different order than the order described in conjunction with FIG. 6.

A video messaging device 130 including a levitating unit 200 and a base unit 250 initiates 600 or receives 600 a video call. For example, the video messaging device 130 may initiate 600 a video call in response to receiving instructions from a user of the video messaging device 130 to place an outgoing video call to an individual having contact information included in a contacts list (e.g., retrieved from the data store 296). As an additional example, the video messaging device 130 may receive 600 a video call in response to receiving instructions from a user of the video messaging device 130 to answer an incoming video call.

Figure 7A:
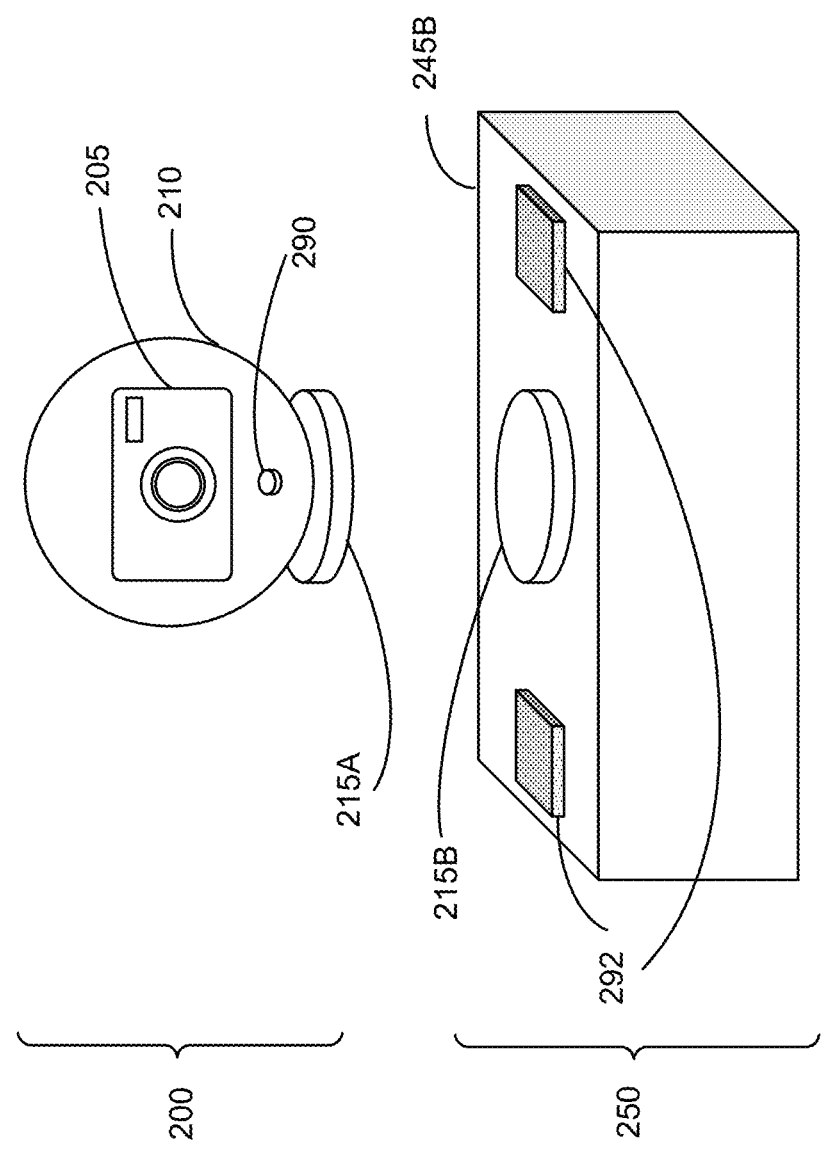
FIGS. 7A-7C illustrate an example of a video messaging device configured to eliminate an effect of rotation of a camera of a video messaging device based on video data captured by the camera, in accordance with an embodiment.

As shown in the example of FIG. 7A, components of the levitating unit 200 may include a camera 205, a magnet/electromagnet 215A of the levitating unit 200, a microphone 290, and a camera housing 210 to which the camera 205, the magnet/electromagnet 215A, and the microphone 290 are coupled. As described above in conjunction with FIG. 2, in some embodiments, the camera 205 may be configured to capture a 360-degree field of view (e.g., using multiple cameras 205 with overlapping fields of view or a camera 205 having multiple lenses that films overlapping angles simultaneously). Although not depicted in FIG. 7A, as described above, components of the levitating unit 200 also may include a power source 220, one or more transmitters 225, a charging component 230A, one or more gyroscopes 240, a platform/housing component 245A, one or more additional speakers 292, one or more displays 294, and a data store 296.

Referring still to FIG. 7A, in some embodiments, components of the base unit 250 include a platform/housing component 245B to which a magnet/electromagnet 215B of the base unit 250 and one or more speakers 292 are coupled. The magnet/electromagnet 215B of the base unit 250 is positioned relative to the magnet/electromagnet 215A of the levitating unit 200 such that when one or more of the electromagnets 215A-B are activated, they repel each other or the magnet(s) 215A-B, which in turn causes the levitating unit 200 to levitate above the base unit 250. Although not depicted in FIG. 7A, as described above, components of the base unit 250 also may include a charging component 230B, one or more receivers 255, a power supply 260, a processor 265, software 270, a storage device 275, memory 280, one or more additional speakers 292, one or more displays 294, and a data store 296.

Figure 7B:
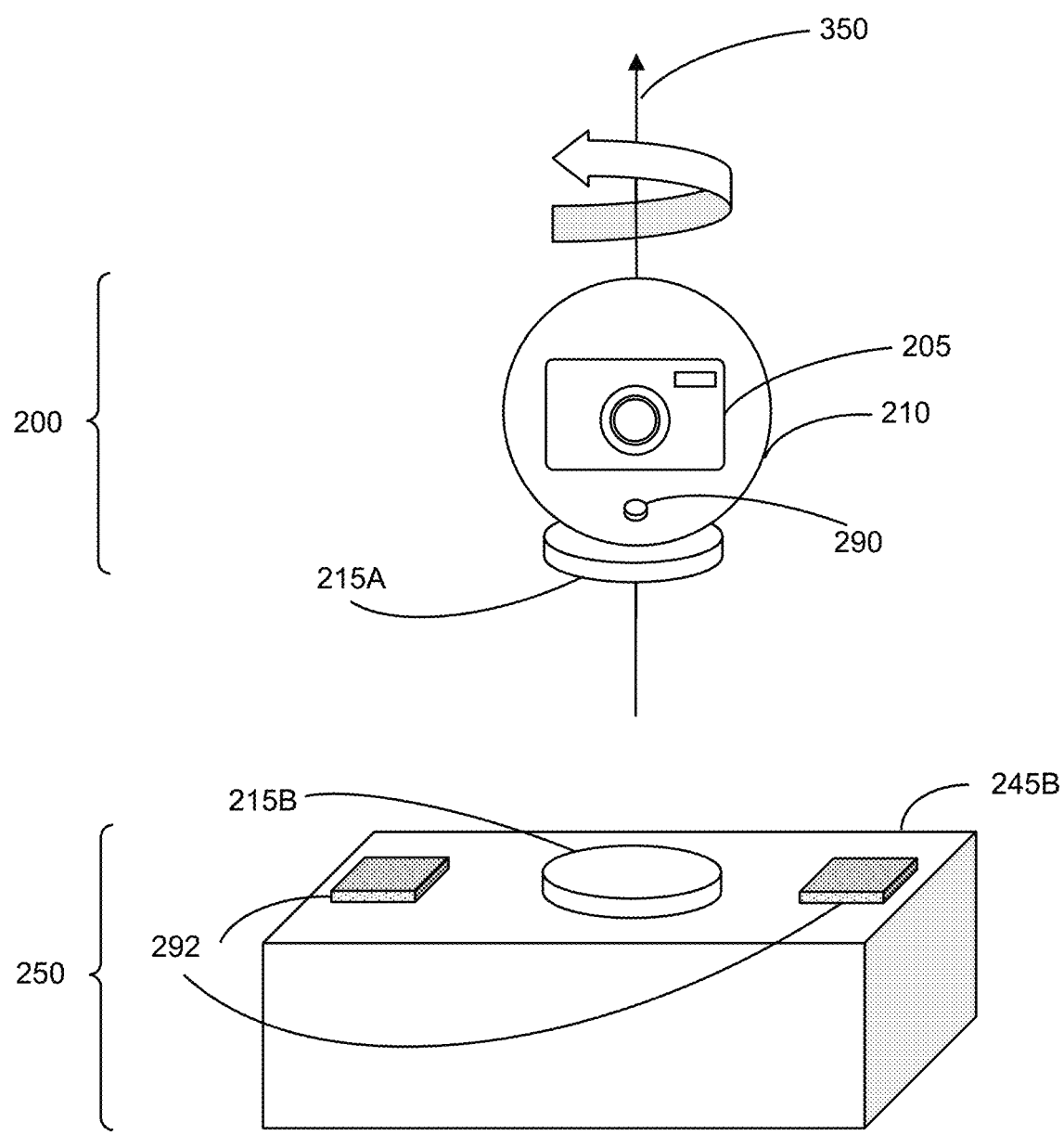
Figure 7C:
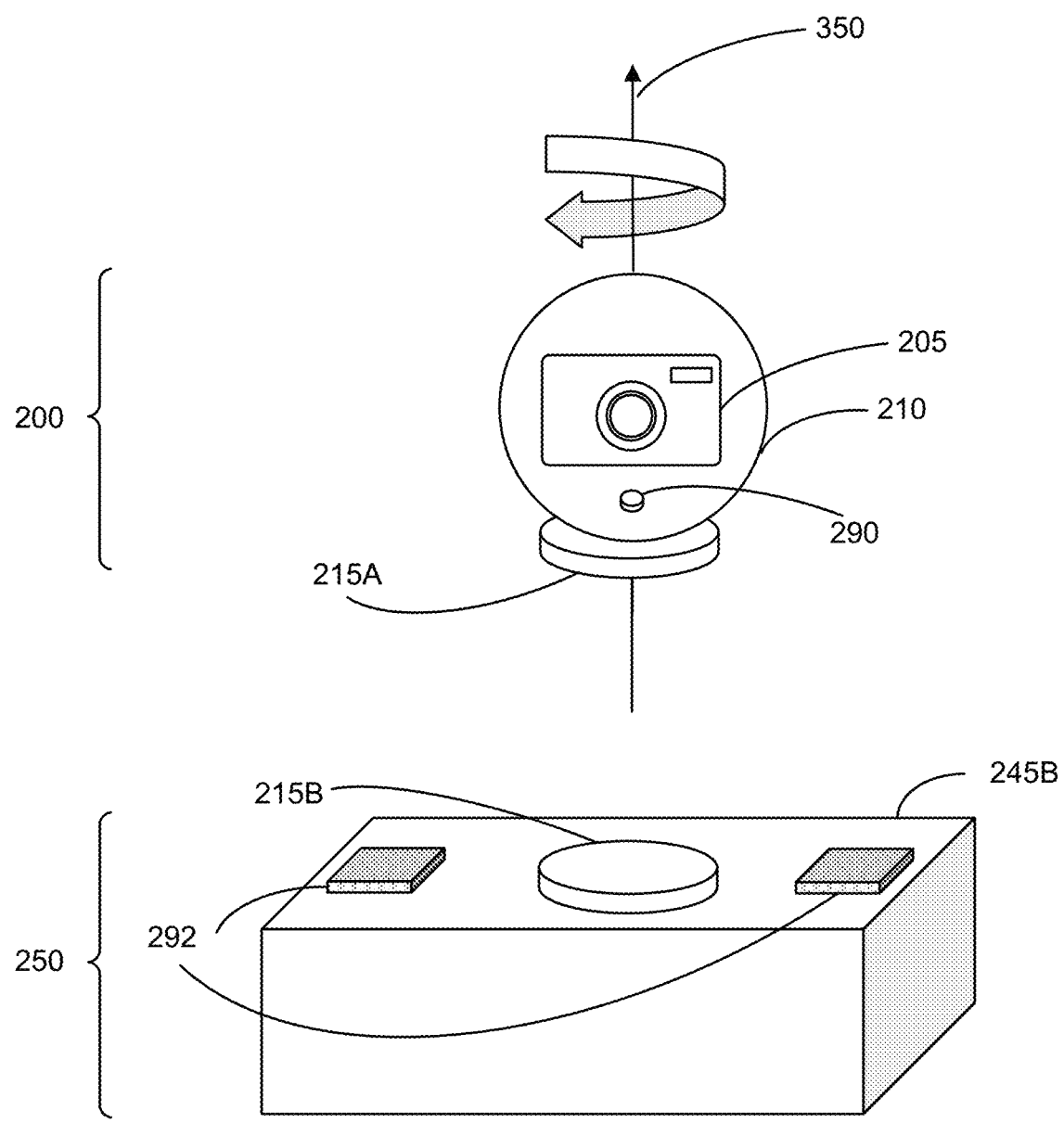

Referring back to FIG. 6, once the video messaging device 130 has initiated 600 or received 600 the video call, one or more electromagnets 215A-B in the levitating unit 200 and/or the base unit 250 are activated 610 (e.g., by drawing power from the power source 220 of the levitating unit 200 and/or from the power supply 260 in the base unit 250), causing the electromagnet(s) 215A-B to produce a magnetic field and repel each other or the magnet 215A-B, which in turn causes the levitating unit 200 to levitate above the base unit 250. Since the levitating unit 200 levitates above the base unit 250 when the video messaging device 130 is in use and components of the levitating unit 200 include the camera 205, the camera 205 is portable and may be moved or carried away from the base unit 250 to other locations for portable applications during the video call. When the video messaging device 130 is in use, since the levitating unit 200 levitates above the base unit 250, the levitating unit 200 may tend to rotate about a vertical axis. As shown in the example of FIG. 7B, the levitating unit 200 may rotate about a vertical axis in a clockwise direction relative to the base unit 250. Similarly, as shown in the example of FIG. 7C the levitating unit 200 may rotate about a vertical axis in a counter-clockwise direction relative to the base unit 250.

Referring again to FIG. 6, video data is then captured 620 by the camera 205 included in the levitating unit 200. The video data captured 620 by the camera 205 has a 360-degree field of view and corresponds to video data associated with a user of the video messaging device 130 to be communicated to an individual to whom the video call was initiated 600 or from whom the video call was received 600. As described above, the video data may include metadata describing the video content captured 620 by the camera 205 (e.g., a date and a time at which the video content was captured 620, information identifying a user of the video messaging device 130 whose face was recognized by the camera 205, locations (e.g., pixel coordinates) and times (e.g., timestamps) at which the face was detected, etc. In various embodiments, if the video messaging device 130 includes one or more displays 294, the video data captured 620 by the camera 205 may be presented in the display(s) 294. For example, a live video feed of a user of the video messaging device 130 being captured 620 by the camera 205 may be presented in a window within the display(s) 294. In conjunction with capturing 620 the video data, audio data to be communicated to an individual to whom a user of the video messaging device 130 is communicating also may be captured by one or more microphones 290 in the levitating unit 200 or in the base unit 250. As described above in conjunction with FIG. 2, in some embodiments, the camera 205 may be configured to capture 620 video data and the microphone(s) 290 may be configured to capture audio data only when the levitating unit 200 is levitating above the base unit 250 for privacy reasons.

Once the video data is captured 620 by the camera 205, the video data is communicated 630 to the base unit 250 via wireless means (e.g., from a transmitter 225 in the levitating unit 200 to a receiver 255 in the base unit 250). For example, video data may be communicated 630 from a transmitter 225 in the levitating unit 200 to a receiver 255 in the base unit 250 via spread-spectrum, Wi-Fi, ultra-wideband, or any other suitable wireless means. In embodiments in which the levitating unit 200 includes a microphone 290, during the video call, audio data also may be wirelessly communicated 630 to the base unit 250 (e.g., from a transmitter 225 in the levitating unit 200 to a receiver 255 in the base unit 250). For example, audio data may be communicated 630 from a transmitter 225 in the levitating unit 200 to a receiver 255 in the base unit 250 via Bluetooth, Wi-Fi, or any other suitable wireless means.

As described above, in embodiments in which the camera 205 captures 620 video data having a 360-degree field of view, the base unit 250 may include a processor 265 and software 270 that eliminates 640 the effect of rotation of the camera 205 based on the video data captured 620 by the camera 205. In such embodiments, once the video data is received at the base unit 250, the processor 265 may carry out software instructions to counteract the tendency of the levitating unit 200 to rotate when the video messaging device 130 is in use. For example, if the camera 205 captures 620 video data having a 360-degree field of view, once the video data is communicated 630 to the base unit 250, a processor 265 in the base unit 250 may carry out software instructions that eliminate 640 the effect of rotation of the camera 205 by discarding video content that captures 620 a field of view beyond a given range. In this example, video data outside of a 60-degree field of view set by a user of the video messaging device 130 at the time that the video messaging device 130 was turned on or at the time that the video messaging device 130 initiated 600 or received 600 a video call may be eliminated 640. As described above, in some embodiments, the instructions included in the software 270 that eliminates 640 the effect of rotation of the camera 205 based on the video data captured 620 by the camera 205 may be stored on the storage device 275, loaded into the memory 280, and executed by the processor 265.

In embodiments in which video data having a 360-degree field of view is captured 620 by the camera 205 and the effect of rotation of the camera 205 is eliminated 640 based on the video data captured 620 by the camera 205, the effect of rotation of the camera 205 also may be eliminated 640 based on various capabilities of the video messaging device 130. In some embodiments, a set of gyroscopes 240 in the levitating unit 200 may detect rotation of the levitating unit 200 and may wirelessly communicate data describing the rotation (e.g., an angular velocity) to the base unit 250 (e.g., from a transmitter 225 in the levitating unit 200 to a receiver 255 in the base unit 250). In such embodiments, the effect of rotation of the camera 205 is then eliminated 640 by the processor 265 and software 270 based on the data describing the rotation of the levitating unit 200 relative to the base unit 250 (e.g., by discarding video content that captures 620 a field of view beyond a given range set by a user of the video messaging device 130).

Figure 8A:
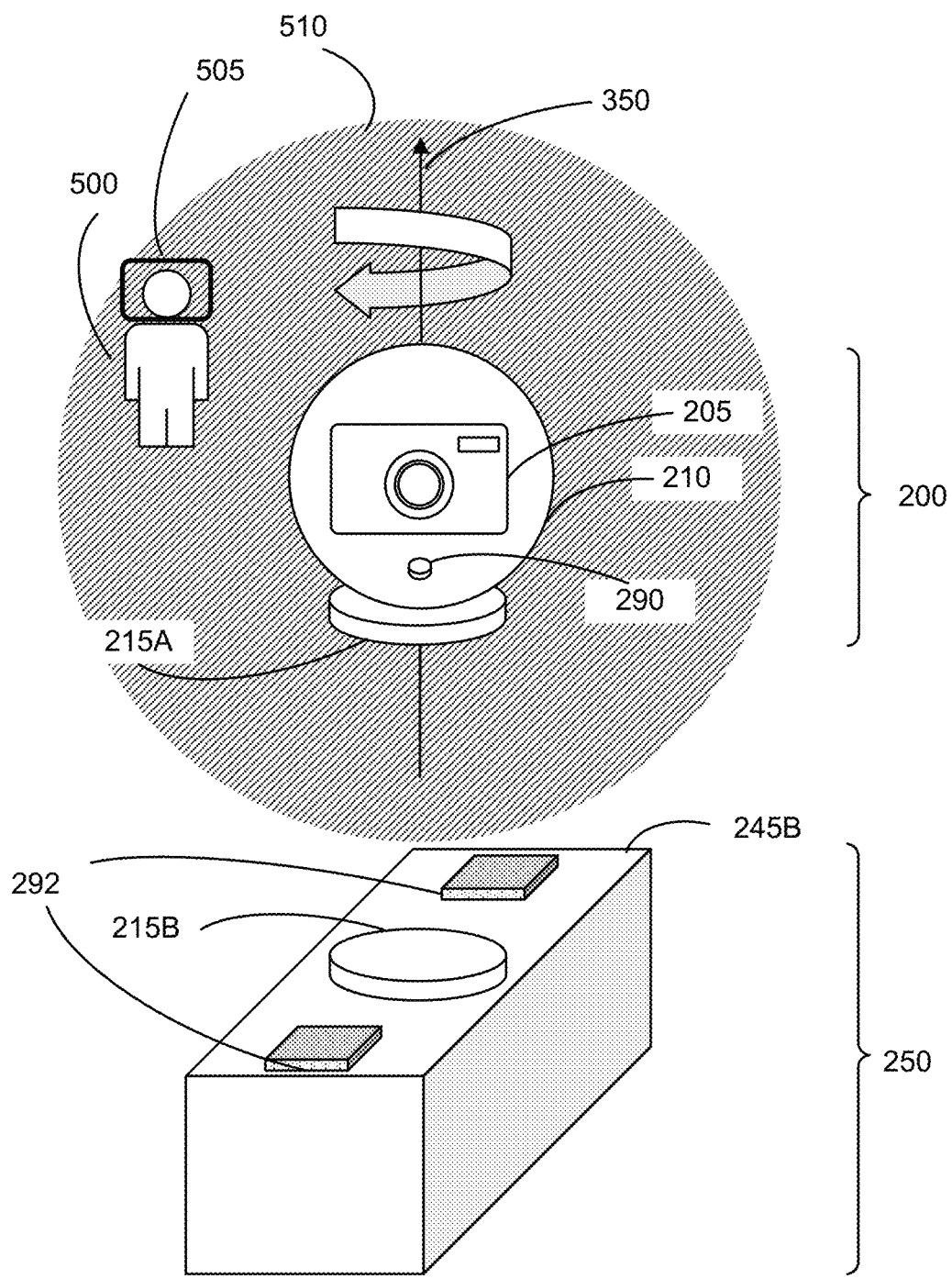
FIG. 8A is a conceptual diagram of making a video call using a video messaging device configured to eliminate an effect of rotation of a camera of a video messaging device based on video data captured by the camera, in accordance with an embodiment.

In embodiments in which capabilities of the camera 205 include face tracking and/or facial recognition technology, the effect of rotation of the camera 205 on the video data captured 620 by the camera 205 may be eliminated 640 based on metadata included among the video data describing one or more faces detected and/or recognized by the camera 205. For example, as shown in FIG. 8A, if a face 505 of a user 500 of the video messaging device 130 is detected by the camera 205, which captures 620 a 360-degree field of view 510, video data communicated 630 from a transmitter 225 in the levitating unit 200 at a receiver 255 in the base unit 250 may include metadata indicating the location (e.g., pixel coordinates) of the detected face 505 in the content captured 620 by the camera 205. In this example, based on the video data received at the base unit 250, the processor 265 may carry out software instructions to discard video content that captures 620 a field of view beyond a given range 510 of the location of the detected face 505. Furthermore, similar to embodiments in which the levitating unit 200 includes a top member 400 and a bottom member 410, in embodiments in which the camera 205 captures 620 a 360-degree field of view, a zoom setting of the camera 205 also may be controlled based on one or more faces detected and/or recognized by the camera 205.

Figure 8B:
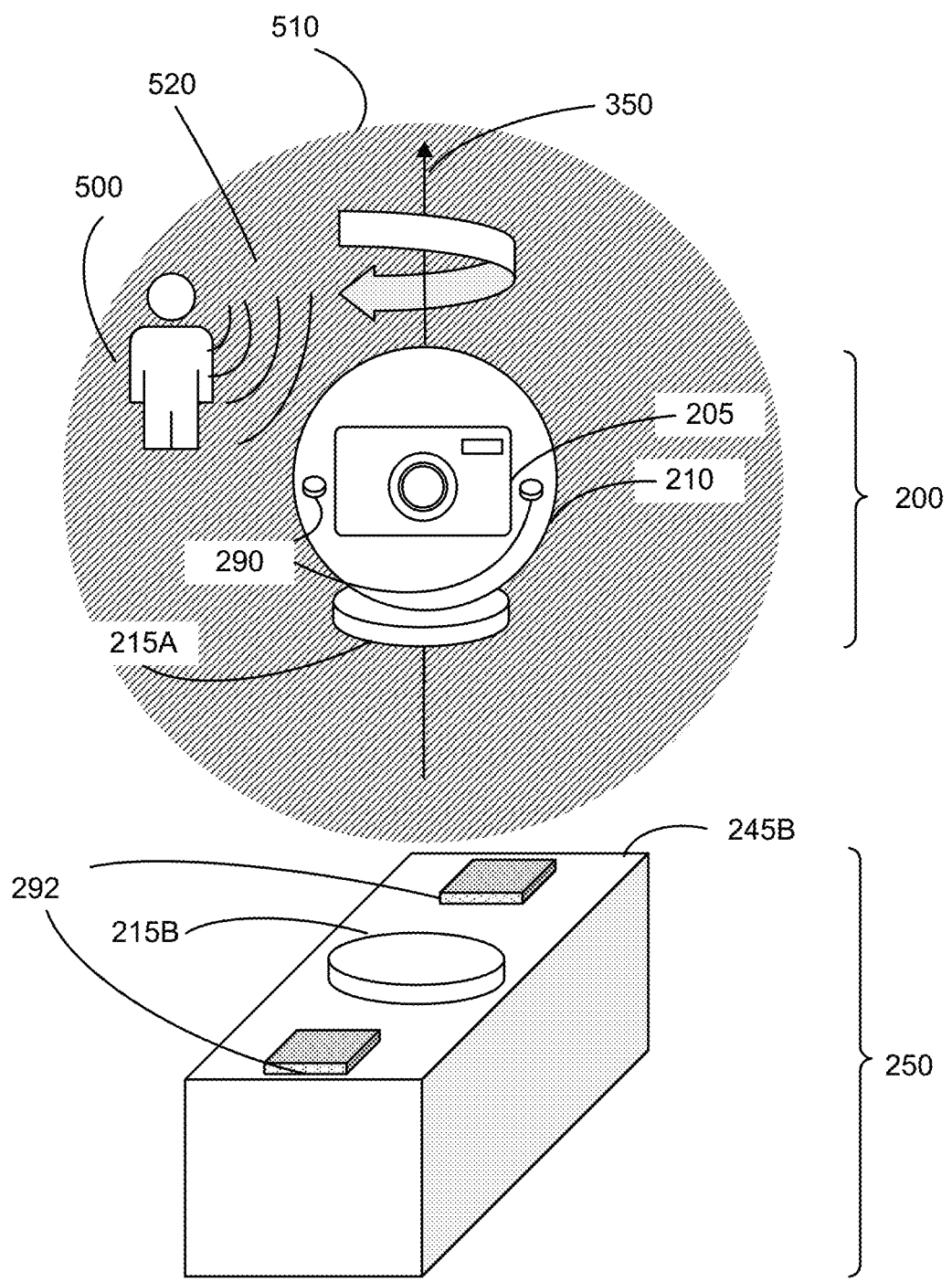
FIG. 8B is an additional conceptual diagram of making a video call using a video messaging device configured to eliminate an effect of rotation of a camera of a video messaging device based on video data captured by the camera, in accordance with an embodiment.

In some embodiments, the effect of rotation of the camera 205 on the video data captured 620 by the camera 205 also may be eliminated 640 based on one or more voices detected by the video messaging device 130 (e.g., by multiple microphones 290 on the video messaging device 130). For example, as shown in FIG. 8B, suppose that multiple microphones 290 are located on multiple locations of the levitating unit 200 and that a camera 205 included in the levitating unit 200 captures 620 a 360-degree field of view 510. In this example, if a voice 520 of a user 500 of the video messaging device 130 is detected by the microphones 290, each microphone 290 may communicate information describing a volume of the detected voice 520 to the processor 265 in the base unit 250, which determines a direction of the voice 520 based on the volume at which each of the microphones 290 detected the voice 520. Continuing with this example, the processor 265 may then carry out software instructions to discard video content that captures 620 a field of view 510 beyond a given range of the direction of the detected voice 520.

Referring again to FIG. 6, in some embodiments, once the effect of rotation of the camera 205 about the vertical axis has been eliminated 640 based on the video data captured 620 by the camera 205, additional processing may be performed by the processor 265 on the video data and/or the audio data. As described above in conjunction with FIG. 2, in some embodiments, the processor 265 may process 650 audio data received at the microphone(s) 290 based on a location of a user of the video messaging device 130 (e.g., using voice reduction technology, voice isolation technology, noise reduction technology, noise isolation technology, etc.). As also described above in conjunction with FIG. 2, in some embodiments, the processor 265 also may process 650 various types of data captured 620 by other components of the video messaging device 130 in real-time to implement virtual reality, augmented reality, and/or mixed reality technology (e.g., by determining the locations and depths of objects detected by the camera 205 and by overlaying virtual objects onto the detected objects or by anchoring virtual objects to the detected objects).

Then, the processed video data and/or the audio data may be communicated 660 to a client device 110 associated with an individual with whom a user of the video messaging device 130 initiated 600 the video call or from whom the user received 600 the video call (e.g., via the network 120). In some embodiments, the processed video data and/or audio data may be communicated 660 to one or more client devices 110 (e.g., wearable headsets) to which the video messaging device 130 is paired (e.g., via the pairing component 298). For example, if the video messaging device 130 has been paired to multiple virtual reality, augmented reality, and/or mixed reality devices that are communicating with each other to play a game, the processed data is communicated 660 to the devices as it is processed.

The video messaging device 130 also may receive 670 video data and/or audio data from the client device 110 associated with the individual with whom the user initiated 600 or received 600 the video call. Video data received 670 at the video messaging device 130 (e.g., a live video feed of the individual) may be presented in one or more displays 294 of the video messaging device 130 while audio data received 670 at the video messaging device 130 may be output using one or more speakers 292 of the video messaging device 130. As described above in conjunction with FIG. 2, in some embodiments, the speaker(s) 292 may output audio data based on a location and/or a distance of a user of the video messaging device 130 relative to the video messaging device 130. In such embodiments, the location and/or distance of the user relative to the video messaging device 130 may be determined by the camera 205 (e.g., using depth sensing, face tracking, and/or facial recognition technology). For example, if the speaker(s) 292 are located on multiple vertical surfaces of the levitating unit 200, audio data may be output from one or more speakers 292 that are facing the direction of a face of a user of the video messaging device 130 detected by the camera 205 and a volume of the audio data output by the speaker(s) 292 may be controlled, such that it is proportional to the distance.

The video messaging device 130 subsequently may terminate 680 the video call (e.g., in response to a request from a user of the video messaging device 130 to end the video call or in response to a loss of network connection by the video messaging device 130). In some embodiments, once the video call is terminated 680, the electromagnet(s) 215A-B may stop drawing power from the power source 220 of the levitating unit 200 and/or the power supply 260 in the base unit 250.

When the video messaging device 130 is not in use, (i.e., when the electromagnet(s) 215A-B are no longer being activated 610), the levitating unit 200 may rest upon the base unit 250 and the power source 220 in the levitating unit 200 may be charged 690 (e.g., using the set of charging components 230A-B in the levitating unit 200 and the base unit 250). As described above, the power source 220 of the levitating unit 200 may be charged 690 via electrical contact between the charging components 230A-B, via inductive charging between the charging components 230A-B, or via any other suitable mechanism. For example, when a bottom surface of the levitating unit 200 is in contact with a top surface of the base unit 250, the base unit 250 serves as a charging station by sending energy to a set of rechargeable batteries that serve as the power source 220 of the levitating unit 200 (e.g., through inductive coupling using a set of induction coils or any other suitable charging components 230A-B in the base unit 250 and the levitating unit 200). As described above, for privacy reasons, the camera 205 may not be configured to capture 620 video data and the microphone(s) 290 may not be configured to capture audio data when the levitating unit 200 is being charged 690.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An apparatus configured to initiate and receive a video call, the apparatus comprising:
   a base unit comprising one or more of a magnet and a first electromagnet; and
   a levitating unit comprising a top member pivotally coupled to a bottom member, the top member configured to rotate relative to the bottom member about a vertical axis to counteract rotation of the bottom member relative to the base unit, the top member comprising a camera configured to wirelessly communicate video data captured by the camera to the base unit, the bottom member comprising a second electromagnet positioned to repel the one or more of the magnet and the first electromagnet comprising the base unit when activated, causing the levitating unit to levitate above the base unit.

2. The apparatus of claim 1, wherein the top member of the levitating unit is configured to rotate relative to the bottom member of the levitating unit via a set of gyroscopes comprising one or more of the top member of the levitating unit and the bottom member of the levitating unit.

3. The apparatus of claim 1, wherein the apparatus is voice-activated.

4. The apparatus of claim 1, wherein the base unit is configured to charge a power source comprising the levitating unit while a bottom surface of the levitating unit is resting upon a top surface of the base unit.

5. The apparatus of claim 1, wherein the camera is capable of being moved away from the base unit during the video call.

6. An apparatus configured to initiate and receive a video call, the apparatus comprising:
   a base unit comprising a processor, one or more of a magnet and a first electromagnet, and a computer readable storage medium having instructions encoded thereon that, when executed by the processor, cause the processor to eliminate an effect of rotation of a camera about a vertical axis based at least in part on video data captured by the camera, the effect caused by the rotation of the camera about the vertical axis; and
   a levitating unit comprising the camera and a second electromagnet, the camera configured to capture a 360-degree field of view and to wirelessly communicate the video data captured by the camera to the base unit, the second electromagnet positioned to repel the magnet or the first electromagnet comprising the base unit when activated, causing the levitating unit to levitate above the base unit.

7. The apparatus of claim 6, wherein the rotation of the camera about the vertical axis is detected by a set of gyroscopes comprising the levitating unit, the set of gyroscopes configured to wirelessly communicate data describing the rotation of the camera to the base unit.

8. The apparatus of claim 6, wherein the apparatus is voice-activated.

9. The apparatus of claim 6, wherein the base unit is configured to charge a power source comprising the levitating unit while a bottom surface of the levitating unit is resting upon a top surface of the base unit.

10. The apparatus of claim 6, wherein the camera is capable of being moved away from the base unit during the video call.

11. A method comprising:
    performing one or more of initiating and receiving a video call using an apparatus, the apparatus comprising:
       a base unit comprising one or more of a magnet and a first electromagnet, and
       a levitating unit comprising a top member pivotally coupled to a bottom member, the top member configured to rotate relative to the bottom member about a vertical axis to counteract rotation of the bottom member relative to the base unit;
    activating a second electromagnet comprising the bottom member of the levitating unit, the second electromagnet positioned to repel the one or more of the magnet and the first electromagnet comprising the base unit when activated, causing the levitating unit to levitate above the base unit;
    capturing video data at a camera comprising the top member of the levitating unit; and
    communicating the video data captured by the camera to the base unit via wireless means.

12. The method of claim 11, wherein the top member of the levitating unit is configured to rotate relative to the bottom member of the levitating unit via a set of gyroscopes comprising one or more of the top member of the levitating unit and the bottom member of the levitating unit.

13. The method of claim 11, wherein the apparatus is voice-activated.

14. The method of claim 11, wherein the levitating unit further comprises a speaker and a microphone, the microphone configured to wirelessly communicate audio data received at the microphone to the base unit.

15. The method of claim 11, wherein capturing the video data at the camera comprising the top member of the levitating unit comprises:
    moving the levitating unit away from the base unit during the video call.

16. A method comprising:
    performing one or more of initiating and receiving a video call using an apparatus comprising:
       a base unit comprising one or more of a magnet and a first electromagnet, and
       a levitating unit comprising a camera configured to capture a 360-degree field of view and a second electromagnet;
    activating the second electromagnet comprising the levitating unit, the second electromagnet positioned to repel the one or more of the magnet and the first electromagnet comprising the base unit when activated, causing the levitating unit to levitate above the base unit;
    capturing video data at the camera comprising the levitating unit;
    communicating the video data captured by the camera to the base unit via wireless means; and
    eliminating an effect of rotation of the camera about a vertical axis based at least in part on the video data captured by the camera, the effect caused by the rotation of the camera about the vertical axis.

17. The method of claim 16, wherein the rotation of the camera about the vertical axis is detected by a set of gyroscopes comprising the levitating unit, the set of gyroscopes configured to wirelessly communicate data describing the rotation of the camera to the base unit.

18. The method of claim 16, wherein the apparatus is voice-activated.

19. The method of claim 16, wherein the levitating unit further comprises a speaker and a microphone, the microphone configured to wirelessly communicate audio data received at the microphone to the base unit.

20. The method of claim 16, wherein capturing the video data at the camera comprising the levitating unit comprises:
 moving the levitating unit away from the base unit during the video call.

\* \* \* \* \*